US010271366B2

(12) United States Patent
Nagayama et al.

(10) Patent No.: US 10,271,366 B2
(45) Date of Patent: Apr. 23, 2019

(54) INFORMATION PROCESSING DEVICE, INFORMATION PROCESSING METHOD, AND PROGRAM

(71) Applicant: SONY CORPORATION, Tokyo (JP)

(72) Inventors: Tomohiko Nagayama, Tokyo (JP); Masahiro Sueyoshi, Kanagawa (JP); Masashi Ishikawa, Kanagawa (JP); Yoshinobu Ito, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 152 days.

(21) Appl. No.: 15/320,944

(22) PCT Filed: May 26, 2015

(86) PCT No.: PCT/JP2015/065034
§ 371 (c)(1),
(2) Date: Dec. 21, 2016

(87) PCT Pub. No.: WO2016/009722
PCT Pub. Date: Jan. 21, 2016

(65) Prior Publication Data
US 2018/0192463 A1 Jul. 5, 2018

(30) Foreign Application Priority Data
Jul. 15, 2014 (JP) ................................ 2014-145071

(51) Int. Cl.
H04W 76/15 (2018.01)
G06Q 20/06 (2012.01)
(Continued)

(52) U.S. Cl.
CPC ............ H04W 76/15 (2018.02); G06K 17/00 (2013.01); G06Q 20/06 (2013.01); H04W 8/005 (2013.01);
(Continued)

(58) Field of Classification Search
CPC ..... H04W 76/15; H04W 8/005; H04W 76/19; H04W 76/18; H04W 12/04; H04W 88/06; G06K 17/00; G06Q 20/06; G06Q 20/327
See application file for complete search history.

(56) References Cited

U.S. PATENT DOCUMENTS

2011/0018754 A1* 1/2011 Tojima ................... G08C 17/00
341/176
2011/0258313 A1* 10/2011 Mallik .................. H04W 8/005
709/224

FOREIGN PATENT DOCUMENTS

JP 2001-155251 6/2001
JP 2003-187163 7/2003
(Continued)

Primary Examiner — Dady Chery
(74) Attorney, Agent, or Firm — Paratus Law Group, PLLC

(57) ABSTRACT

There is provided an information processing device including: a processing unit configured to acquire device-related information including identification information with which a communication target device can be specified from the communication target device when first communication with the communication target device is started, and to perform a process via communication with the communication target device using the first communication or second communication whose communicable range is wider than the first communication. The processing unit starts the second communication using the acquired device-related information when the first communication is interrupted during execution of the process via communication based on the first communication and thus the process via communication that has been executed is uncompleted in the case in which the process via communication is performed using the first communication, and performs the uncompleted process via communication with the communication target device using the second communication.

9 Claims, 21 Drawing Sheets

(51) Int. Cl.
*G06K 17/00* (2006.01)
*H04W 76/18* (2018.01)
*H04W 8/00* (2009.01)
*H04W 12/04* (2009.01)
*H04W 76/19* (2018.01)
*G06Q 20/32* (2012.01)
*H04W 88/06* (2009.01)

(52) U.S. Cl.
CPC ........... *H04W 12/04* (2013.01); *H04W 76/18* (2018.02); *H04W 76/19* (2018.02); *G06Q 20/327* (2013.01); *H04W 88/06* (2013.01)

(56) References Cited

FOREIGN PATENT DOCUMENTS

| | | |
|---|---|---|
| JP | 2004-166090 | 6/2004 |
| JP | 2004-234185 | 8/2004 |
| JP | 2004-247794 | 9/2004 |
| JP | 2009-187476 | 8/2009 |

\* cited by examiner

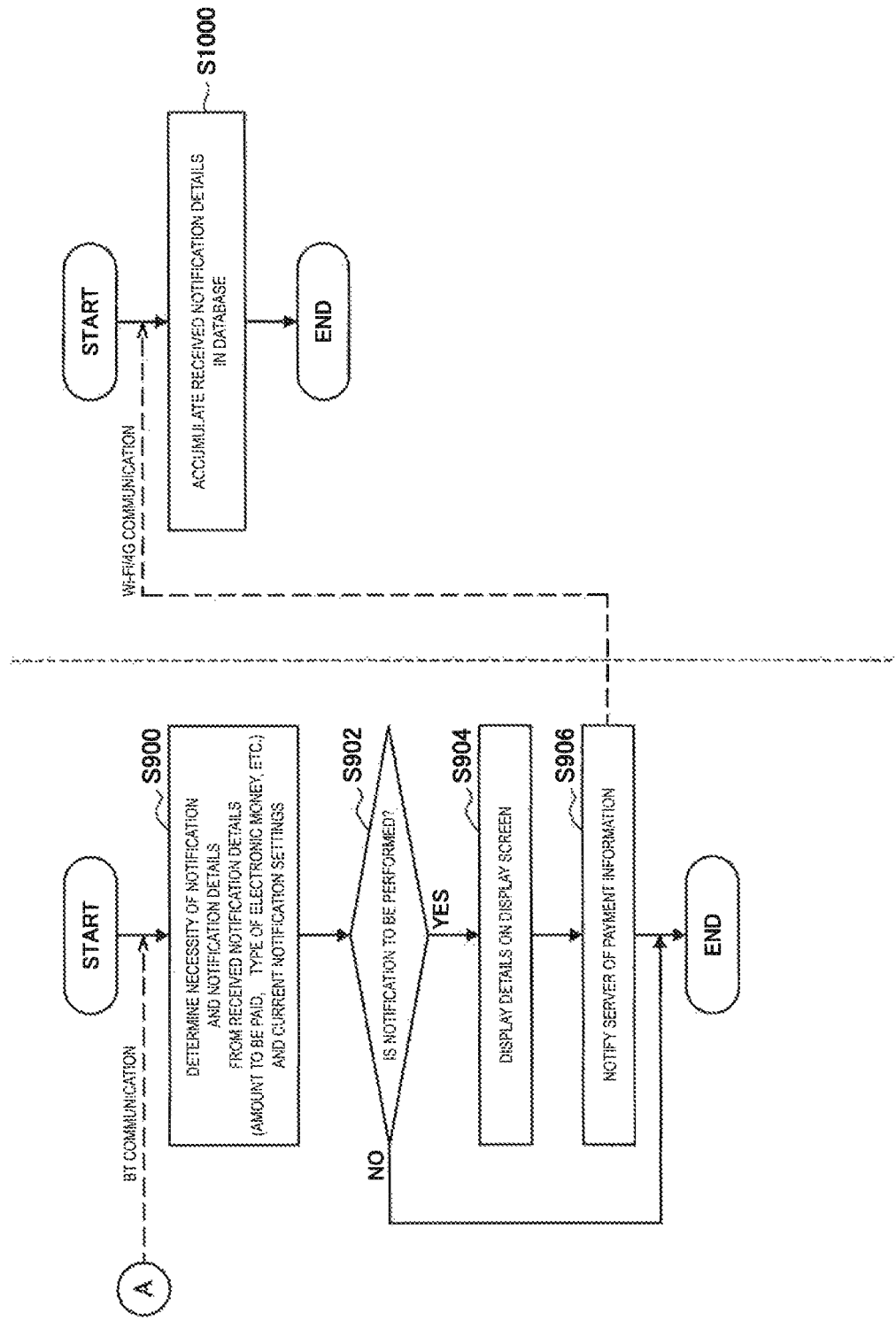

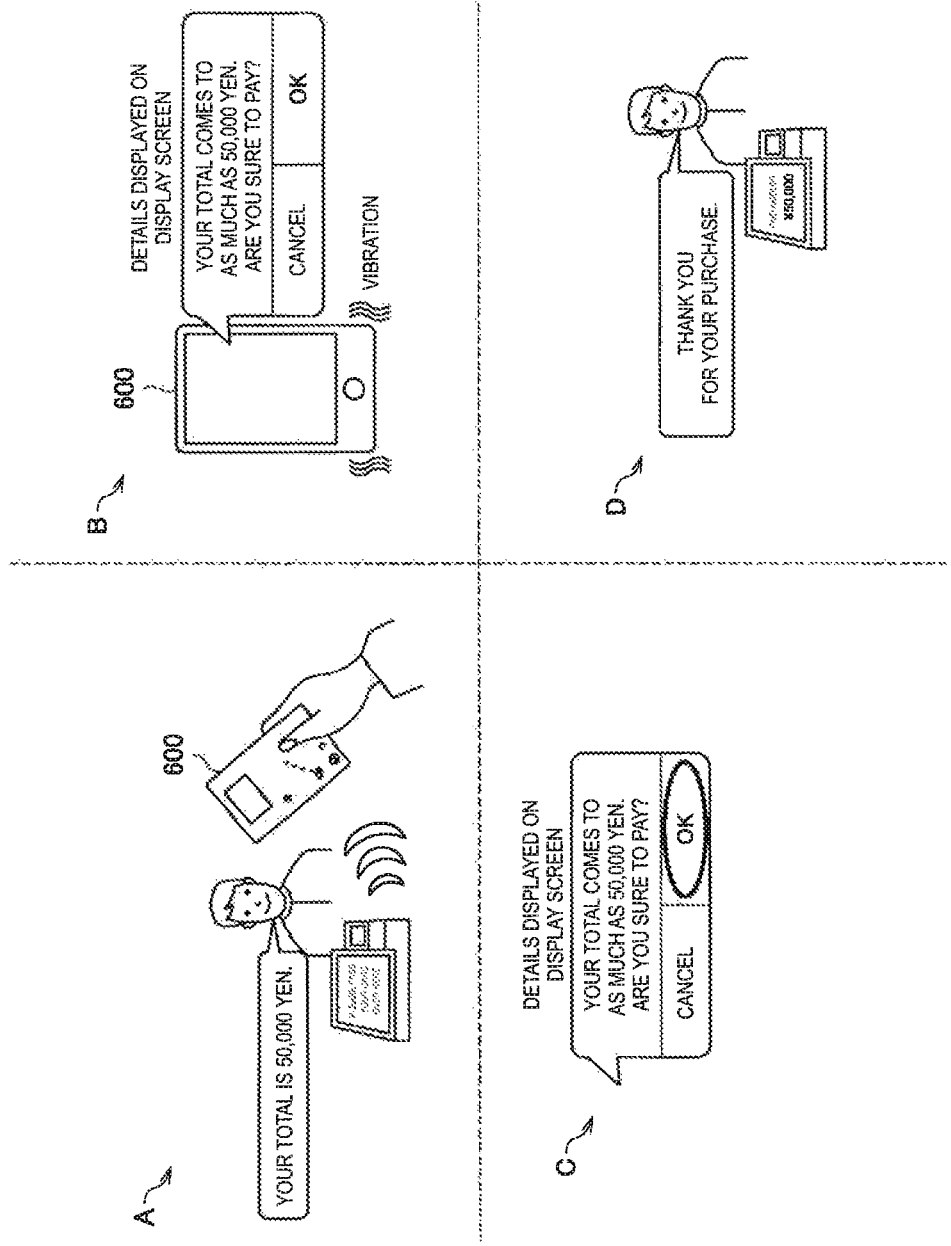

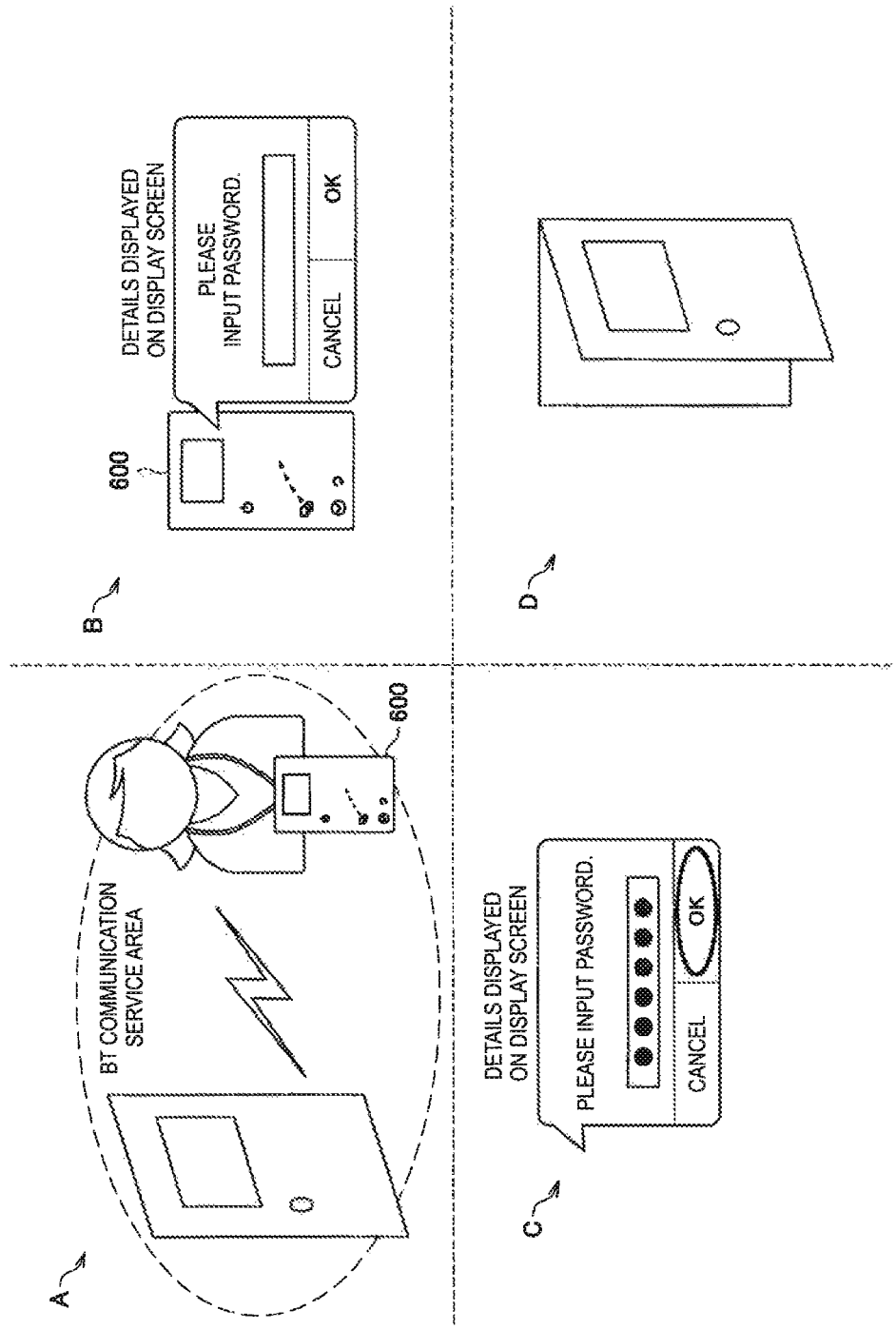

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2015/065034 (filed on May 26, 2015) under 35 U.S.C. § 371, which claims priority to Japanese Patent Application No. 2014-145071 (filed on Jul. 15, 2014), which are all hereby incorporated by reference in their entirety.

TECHNICAL FIELD

The present disclosure relates to an information processing device, an information processing method, and a program.

BACKGROUND ART

Technologies in which a plurality of devices perform a process using communication have been developed. As a technology in which a plurality of devices perform a payment process using contactless communication, for example, there is the technology described in Patent Literature 1 below.

CITATION LIST

Patent Literature

Patent Literature 1: JP 2009-187476A

SUMMARY OF INVENTION

Technical Problem

When a plurality of devices perform a process using communication, for example, if one device leaves a communicable range of another device, the communication can be interrupted during the process. In addition, since the communication is interrupted, the process performed in the communication is uncompleted.

Here, when the technology disclosed in Patent Literature 1 is used, for example, a user of one device performs an operation of passing the one device over the other device to perform contactless communication again, and thereby the uncompleted process can be performed between the plurality of devices. However, when a user operation is necessary for causing the uncompleted process to be performed again between the plurality of devices as described above, there is concern of user convenience diminishing.

The present disclosure proposes a novel and improved information processing device, information processing method, and program which enable user convenience to be enhanced.

Solution to Problem

According to the present disclosure, there is provided an information processing device including: a processing unit configured to acquire device-related information including identification information with which a communication target device can be specified from the communication target device when first communication with the communication target device is started, and to perform a process via communication with the communication target device using the first communication or second communication whose communicable range is wider than the first communication. The processing unit starts the second communication using the acquired device-related information when the first communication is interrupted during execution of the process via communication based on the first communication and thus the process via communication that has been executed is uncompleted in the case in which the process via communication is performed using the first communication, and performs the uncompleted process via communication with the communication target device using the second communication.

According to the present disclosure, there is provided an information processing method including: steps of acquiring device-related information including identification information with which a communication target device can be specified from the communication target device when first communication with the communication target device is started, and performing a process via communication with the communication target device using the first communication or second communication whose communicable range is wider than the first communication. In the step of performing the process, the second communication is started using the acquired device-related information when the first communication is interrupted during execution of the process via communication based on the first communication and thus the process via communication that has been executed is uncompleted in the case in which the process via communication is performed using the first communication, and the uncompleted process via communication with the communication target device is performed using the second communication.

According to the present disclosure, there is provided a program causing a computer to execute steps of acquiring device-related information including identification information with which a communication target device can be specified from the communication target device when first communication with the communication target device is started, and performing a process via communication with the communication target device using the first communication or second communication whose communicable range is wider than the first communication. In the step of performing the process, the second communication is started using the acquired device-related information when the first communication is interrupted during execution of the process via communication based on the first communication and thus the process via communication that has been executed is uncompleted in the case in which the process via communication is performed using the first communication, and the uncompleted process via communication with the communication target device is performed using the second communication.

Advantageous Effects of Invention

According to the present disclosure, user convenience can be enhanced.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 16B is an illustrative diagram for describing a notification method according to the present embodiment.

FIG. 17 is an illustrative diagram for describing a notification method according to the present embodiment.

FIG. 18 is an illustrative diagram for describing a notification method according to the present embodiment.

DESCRIPTION OF EMBODIMENT(S)

Figure 1:
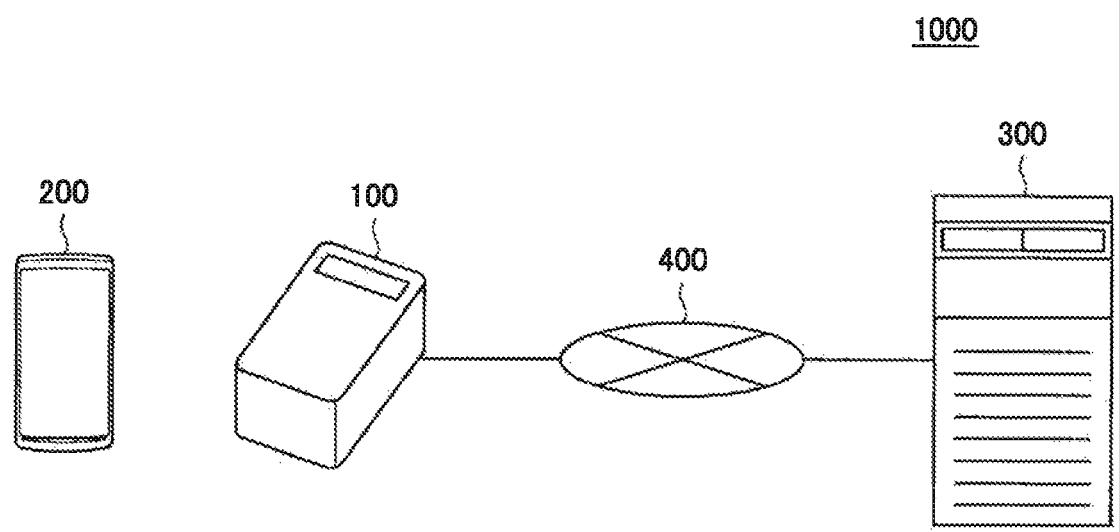
FIG. 1 is an illustrative diagram showing an example of an information processing system according to a first embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In addition, description will be provided in the following order below.

1. Information processing method according to present embodiment

2. Information processing system according to first embodiment

3. Information processing device according to present embodiment

4. Program according to present embodiment

5. Information processing system according to second embodiment (Information Processing Method According to Present Embodiment)

[i] Overview of Information Processing Method According to Present Embodiment

An information processing method according to the present embodiment will be described before configurations of an information processing system according to the present embodiment and an information processing device according to the present embodiment constituting the information processing system according to the present embodiment are described. A case in which the information processing device according to the present embodiment performs a process of the information processing method according to the present embodiment will be exemplified below.

When a user operation is necessary for causing an uncompleted process to he performed again between a plurality of devices, there is concern of user convenience diminishing, as described above.

Thus, when a process via communication based on communication according to one communication scheme with a communication target device is uncompleted, for example, the information processing device according to the present embodiment switches the communication with the communication target device to communication according to another communication scheme. Then, the information processing device according to the present embodiment performs the uncompleted process via communication using the communication according to the other communication scheme.

When the process via communication is uncompleted as described above, the information processing device according to the present embodiment switches the communication performed with a communication target device to communication of a different communication scheme, and the information processing device according to the present embodiment performs the uncompleted process without a predetermined operation performed by the user, such as a passing-over operation. Here, the passing-over operation according to the present embodiment refers to an operation of moving the information processing device into a communicable range in which communication based on near field communication (NFC) is possible with, for example, a device which can communicate based on NFC (for example, a device playing a role of a reader/writer in NFC).

Consequently, as the information processing device according to the present embodiment performs a process of the information processing method according to the present embodiment, even when communication is interrupted for any reason and a process via the communication is uncompleted, the information processing device according to the present embodiment can perform the uncompleted process via communication without a predetermined operation performed by the user, such as a passing-over operation. Thus, as the information processing device according to the present embodiment performs the process of the information processing method according to the present embodiment, smooth continuation of services corresponding to the process via the communication is realized.

Thus, as the information processing device according to the present embodiment performs the process of the information processing method according to the present embodiment, enhancement in user convenience can be achieved.

In addition, when a process via communication based on communication according to one communication scheme is uncompleted, the information processing device according to the present embodiment switches the communication with a communication target device to communication according to another communication scheme to perform the uncompleted process via communication, as described above. Thus, when the information processing system according to the present embodiment that includes the information processing device according to the present embodiment is a system for payment in a real store, for example, occupation of a cash register by a customer attributable to an uncompleted payment process, or a necessity of extra time for services related to payment can be suppressed.

[ii] Process of Information Processing Method According to Present Embodiment

The information processing device according to the present embodiment performs a process via communication with a communication target device using first communication or second communication whose communicable range is wider than the first communication.

Here, as the process via communication according to the present embodiment, for example, a payment process relating to an arbitrary payment scheme such as payment using electronic values (money or data having values equivalent to money, which may be referred to as "electronic money" hereinbelow) or payment using a credit card is exemplified. Note that the process via communication according to the present embodiment is not limited to a payment process, and it may be a process relating to an arbitrary service, for example, a process relating to entrance/exit to and from a room, a venue, or the like.

In addition, as the first communication according to the present embodiment, for example, wireless communication such as NFC or infrared communication is exemplified. Note that the first communication may be wired communication using, for example, a Universal Serial Bus (USB), or the like. A case in which the first communication according to the present embodiment is NFC will be exemplified below.

The information processing device according to the present embodiment performs the first communication with a communication target device using, for example, a first communication unit (to be described below) which is provided in the information processing device according to the present embodiment and can perform the first communication, or an external communication device which is connected with the information processing device according to the present embodiment and can perform the first communication.

In addition, as the second communication according to the present embodiment, wireless communication whose communicable range is wider than the first communication, for example, wireless communication using IEEE 802.15.1 such as Bluetooth Low Energy (BLE) (which can be referred to as "BT" hereinbelow), wireless communication using IEEE 802.11, or the like is exemplified. When the second communication according to the present embodiment is wireless communication using IEEE 802.15.1 such as BLE, the second communication is communication that can be performed with low power consumption.

The information processing device according to the present embodiment performs the second communication with a communication target device using, for example, a second communication unit (to be described below) which is provided in the information processing device according to the present embodiment and can perform the second communication, or an external communication device which is connected with the information processing device according to the present embodiment and can perform the second communication.

The second communication according to the present embodiment is performed using, for example, device-related information. The device-related information according to the present embodiment includes, for example, identification information (data) with which a device can be specified, such as an ID or a Media Access Control (MAC) address of a device. In addition, the device-related information according to the present embodiment may include, for example, key information (data). Key information according to the present embodiment is used in, for example, authentication in the second communication, or execution of a process for a service (for example, authentication in execution of a process for a service, or the like).

When the first communication with a communication target device is started, the information processing device according to the present embodiment acquires the device-related information from the communication target device. The information processing device according to the present embodiment acquires the device-related information by, for example, transmitting a transmission request including a transmission command for causing the device-related information to be transmitted to the communication target device. In addition, the information processing device according to the present embodiment can also acquire the device-related information by, for example, receiving the device-related information autonomously transmitted by the communication target device in the first communication unit (to be described below).

More specifically, the information processing device according to the present embodiment performs, for example, processes shown in (A) and (B) below using the first communication and the second communication.

(A) First Example of Process of Information Processing Method According to Present Embodiment When the first communication with a communication target device is started, the information processing device according to the present embodiment acquires the device-related information from the communication target device. In addition, when the first communication is started, the information processing device according to the present embodiment performs the process via communication with the communication target device using the started first communication.

When the first communication is interrupted during execution of the process via communication based on the first communication and thus the process via communication that has been executed is uncompleted, the information processing device according to the present embodiment starts the second communication using the acquired device-related information. Then, using the second communication, the information processing device according to the present embodiment performs the uncompleted process via communication with the communication target device.

When the process of the first example is performed, if the process via communication based on the first communication is uncompleted, the information processing device according to the present embodiment switches the communication with the communication target device to the second communication, and performs the uncompleted process via communication using the switched second communication. Thus, as the process of the first example is performed, the information processing device according to the present embodiment can achieve enhancement in user convenience.

(B) Second Example of Process of Information Processing Method According to Present Embodiment When the first communication with a communication target device is started, the information processing device according to the present embodiment acquires the device-related information from the communication target device. Upon acquiring the device-related information, the information processing device according to the present embodiment determines whether or not there is an uncompleted process corresponding to the communication target device based on the acquired device-related information and state information.

Here, the state information according to the present embodiment refers to data indicating a state of the process via communication. As the state information according to the present embodiment, for example, data in which one piece of identification information is associated with data indicating a state of a process, or a table (or a database) in which respective pieces of identification information are stored in association with data indicating states of a process is exemplified. In addition, the state information according to the present embodiment may be data in an arbitrary form with which a state of the process via communication corresponding to the acquired device-related information can be specified.

Data indicating a state of a process according to the present embodiment includes, for example, data with which a process can be specified, such as a process ID, and data indicating whether or not a process is completed, such as a flag. In addition, the data indicating a state of a process according to the present embodiment may further include, for example, data indicating an extent to which a process relating to communication has progressed (or data indicating a remaining portion of the process), or various kinds of data to be used in the remaining portion of the process, such as a process parameter.

The information processing device according to the present embodiment specifies a state of the process via communication corresponding to the acquired device-related information by referring to state information stored in, for example, a storage unit (to be described below) provided in the information processing device according to the present embodiment, or an external recording medium connected with the information processing device according to the present embodiment. Then, the information processing device according to the present embodiment determines whether there is an uncompleted process corresponding to the communication target device based on the specified state of the process via communication.

In addition, the information processing device according to the present embodiment can, for example, perform communication with an external device such as a server managing state information, acquire the state information corresponding to the acquired device-related information from the external device, and thereby can specify a state of the process via communication corresponding to the acquired device-related information. Then, the information processing device according to the present embodiment determines whether there is an uncompleted process corresponding to the communication target data based on the specified state of the process via communication.

Here, the communication with the external device may be the first communication or the second communication, or communication according to another communication scheme such as wireless communication via a local area network (LAN) or a base station. The information processing device according to the present embodiment, for example, transmits a transmission request, which includes identification information included in the acquired device-related information and a command for causing the state information to be transmitted, to the external device, and thereby acquires the state information corresponding to the acquired device-related information from the external device.

When the external device manages the state information, the information processing device according to the present embodiment, for example, causes the external device to transmit the state information corresponding to the communication target device according to a result of the process via communication that has been executed.

When the process via communication that has been executed is completed, for example, the information processing device according to the present embodiment causes the external device to transmit the state information corresponding to the communication target device.

In addition, when the process via communication that has been executed is uncompleted, for example, the information processing device according to the present embodiment causes the external device to transmit the state information corresponding to the communication target device. Here, when the information processing device according to the present embodiment switches the first communication to the second communication through the process of the information processing method according to the present embodiment, such as the process of the first example shown in (A) described above and thereby performs the process via communication, if the second communication is interrupted during the execution of the process via communication based on the switched second communication and thus the process via communication that has been executed is uncompleted, the information processing device according to the present embodiment causes the external device to transmit the state information corresponding to the communication target device.

When it is determined that there is no uncompleted process corresponding to the communication target device, the information processing device according to the present embodiment performs a process similar to the process of the first example shown in (A) described above.

In addition, when it is determined that there is an uncompleted process corresponding to the communication target device, the information processing device according to the present embodiment, for example, starts the second communication with the communication target device using the acquired device-related information, and performs the uncompleted process via communication with the communication target device using the second communication based on the state information. The information processing device according to the present embodiment, for example, specifies the uncompleted process via communication using the state information, and then performs the uncompleted process via communication. In addition, when a remaining process in the process via communication can be specified from the state information, the information processing device according to the present embodiment may perform only the remaining process of the uncompleted process via communication.

When the process of the second example is performed, the information processing device according to the present embodiment determines whether or not there is an uncompleted process corresponding to the communication target device.

When it is determined that there is no uncompleted process corresponding to the communication target device, the information processing device according to the present embodiment performs a process similar to the process of the first example shown in (A) described above. Thus, the information processing device according to the present embodiment can achieve enhancement in user convenience, as in the process of the first example shown in (A) described above.

In addition, when it is determined that there is an uncompleted process corresponding to the communication target device, the information processing device according to the present embodiment performs the uncompleted process via communication with the communication target device using the second communication. That is, when the process of the second example is performed, the information processing device according to the present embodiment can perform the uncompleted process via communication without a predetermined operation performed by the user such as a passing-over operation. Thus, the information processing device according to the present embodiment can achieve enhancement in user convenience.

Therefore, by performing the process of the second example, the information processing device according to the present embodiment can achieve enhancement in user convenience.

As the process of the information processing method according to the present embodiment, the information processing device according to the present embodiment performs, for example, the process of the first example shown in (A) described above, or the process of the second example shown in (B) described above. Note that the process of the information processing method according to the present embodiment is not limited to the process of the first example shown in (A) described above, or the process of the second example shown in (B) described above.

A specific example of the process of the information processing method according to the present embodiment will be described below while an example of the information processing system according to the present embodiment that includes the information processing device according to the present embodiment is exemplified.

A case in which the process via communication according to the present embodiment is a payment process will be exemplified below. Note that it is a matter of course that the process via communication according to the present embodiment is not limited to a payment process as described above.

In addition, a case in which the first communication according to the present embodiment is NFC will be described below.

(Information Processing System According to First Embodiment)

FIG. 1 is an illustrative diagram showing an example of an information processing system 1000 according to a first embodiment.

The information processing system 1000 has a processing device 100, an information processing terminal 200, and a server 300. In FIG. 1, an example in which the processing device 100 and the server 300 are connected to each other via a network 400 is shown. Here, as the network according to the present embodiment, for example, a wired network such as a LAN or a wide area network (WAN), a wireless network such as a wireless local area network (WLAN), the Internet using a communication protocol such as Transmission Control Protocol/Internet Protocol (TCP/IP), or the like is exemplified.

In the information processing system 1000, either the processing device 100 or the information processing terminal 200 or both have a function of performing the process of the information processing method according to the present embodiment. That is, in the information processing system 1000, either the processing device 100 or the information processing terminal 200 or both play a role of the information processing device according to the present embodiment. The processing device 100 may be referred to as a "first information processing device" and the information processing terminal 200 as a "second information processing device" hereinbelow.

Note that the information processing system according to the present embodiment is not limited to the example shown in FIG. 1. The information processing system according to the present embodiment may not have, for example, the server 300. In addition, the information processing system according to the present embodiment may have, for example, a configuration having a plurality of processing devices 100, or a configuration having a plurality of information processing terminals 200. An example of the process of the information processing method according to the present embodiment will be described exemplifying the information processing system 1000 shown in FIG. 1.

[1] First Example of Process Performed in Information Processing System 1000

As a first example of a process performed in the information processing system 1000, an example of a process in which the processing device 100 plays a role of the information processing device according to the present embodiment and the process of the first example shown in (A) described above is performed in the processing device 100 will be shown.

Figure 2:
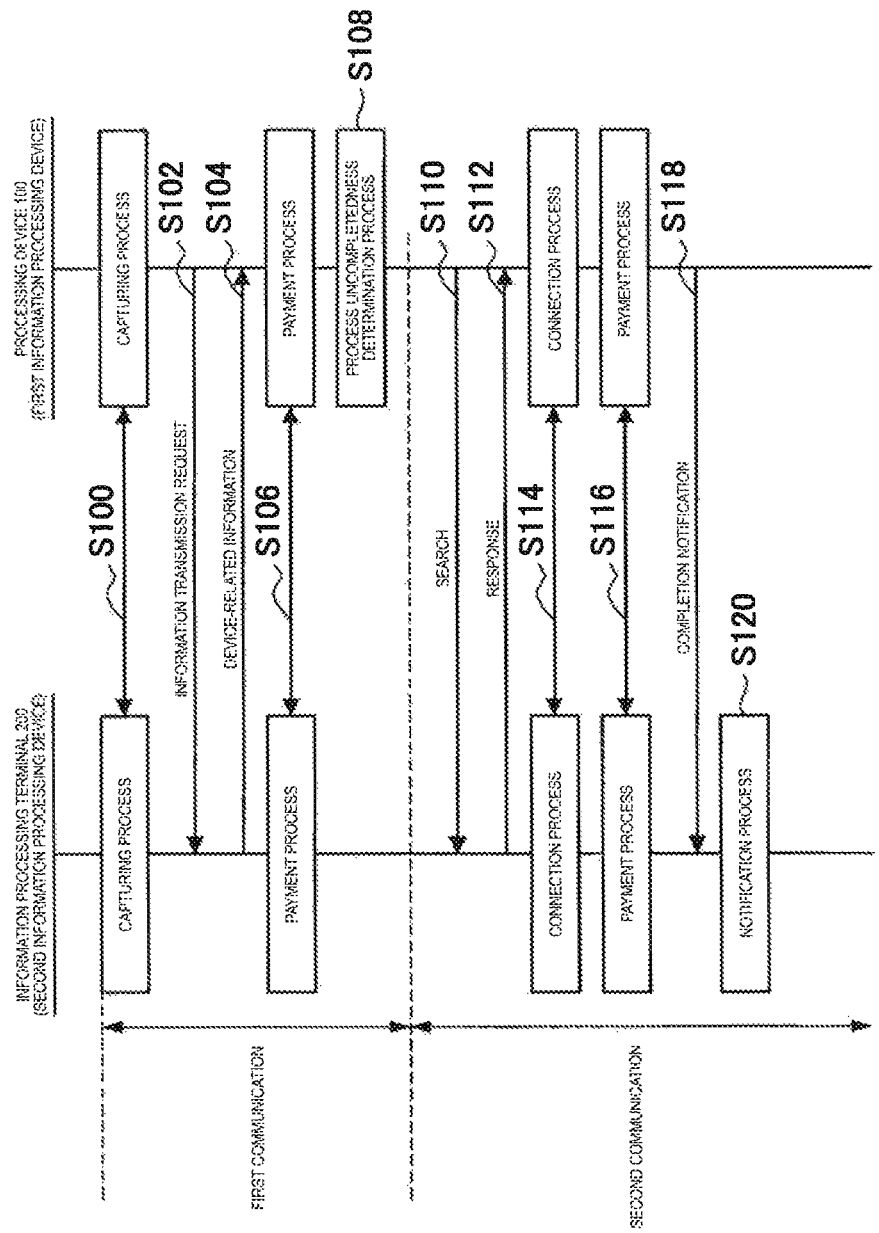
FIG. 2 is an illustrative diagram showing a first example of a process performed in the information processing system according to the first embodiment.

FIG. 2 is an illustrative diagram showing a first example of the process performed in the information processing system 1000 according to the first embodiment.

When a user of the information processing terminal 200 performs a passing-over operation and thus a distance between the information processing terminal 200 and the processing device 100 is within a communicable range of the first communication, for example, the processing device 100 and the information processing terminal 200 perform a capturing process for detecting a communication target that performs the first communication (S100).

Here, in the process of Step S100, the processing device 100, for example, plays a role of a reader/writer that autonomously transmits a magnetic field (which will be referred to as a "carrier" hereinbelow) with a predetermined frequency such as 13.56 [MHz], and the information processing terminal 200 plays a role of giving a response thereto by performing load modulation based on a received carrier. More specifically, the process of Step S100 is performed by, for example, the processing device 100 periodically or aperiodically transmitting a polling signal on a carrier, and then receiving a response signal transmitted using load modulation from the information processing terminal 200 that has received the carrier. Note that, in the information processing system 1000, the information processing terminal 200 may play a role of a reader/writer.

When the information processing terminal 200 has been detected in Step S100, the processing device 100 transmits a transmission request for causing device-related information to be transmitted using the first communication (S102).

The information processing terminal 200 that has received the transmission request transmitted from the processing device 100 in Step S102 transmits the device-related information using the first communication (S104).

Upon receiving the device-related information transmitted from the information processing terminal 200 in Step S104, the processing device 100 performs a payment process via the first communication with the information processing terminal 200 (an example of the process via communication) (S106).

When a payment process using electronic values stored in the information processing terminal 200 is performed, for example, the processing device 100 acquires a value of the electronic values stored in the information processing terminal 200 from the information processing terminal 200, and performs payment using the value of the electronic values stored in the information processing terminal 200. Then, the processing device 100 transmits an updating request of the electronic values according to the result of the payment to the information processing terminal 200. In addition, the information processing terminal 200 performs processes according to various requests transmitted from the processing device 100.

When the process of Step S106 is started, the processing device 100, for example, determines whether or not the payment process that has been performed is uncompleted due to interruption of the first communication (S108). When no response from the information processing terminal 200 is detected for a set predetermined period of time before the payment process is completed, for example, the processing device 100 determines that the payment process is uncompleted due to interruption of the first communication.

The processing device 100 repeats the process of Step S108 until, for example, the payment process is completed, or the payment process is determined to be uncompleted due to interruption of the first communication.

When the process of Step S106 is completed, the processing device 100 and the information processing terminal 200 end the process via the first communication.

When the payment process is determined to be uncompleted due to interruption of the first communication in the process of Step S108, the processing device 100 starts the second communication using the device-related information acquired in Step S104.

The processing device 100 searches for the information processing terminal 200 using, for example, identification information or key information included in the acquired device-related information (S110). When the information processing terminal 200 gives a response to the search of Step S110 (S112), the processing device 100 and the information processing terminal 200 perform a connection process for performing the second communication (S114). The processing device 100 and the information processing terminal 200 perform, for example, mutual authentication, or the like in Step S114.

When the process of Step S114 creates a state in which the second communication is possible, the processing device 100 and the information processing terminal 200 perform the uncompleted payment process of Step S106 via the second communication (S116).

Note that, although not shown in FIG. 2, the processing device 100 can also determine whether or not the payment process that has been performed is uncompleted due to interruption of the second communication, for example, by performing a process similar to Step S108. In FIG. 2, a case in which the payment process is completed without determination that the payment process that has been performed is uncompleted due to interruption of the second communication is exemplified. In addition, a process performed when the process that has been performed is determined to be uncompleted due to interruption of the second communication will be described in a fourth example of the process performed in the information processing system 1000 to be described below.

When the payment process is completed in Step S116, the processing device 100 transmits a completion notification for notifying the information processing terminal 200 of the fact that the payment process has been completed using the second communication (S118). Here the completion notification may include data indicating an image or text indicating notification details.

The information processing terminal 200 that has received the completion notification transmitted from the processing device 100 in Step S118 notifies a user of the fact that the payment process has been completed (S120).

The information processing terminal 200 notifies the user of the fact that the payment process has been completed using an arbitrary method in which the user can be notified of that fact, for example, visual notification performed by causing text, an image, or the like to be displayed on a display screen, auditory notification performed by causing a sound (including music) to be output from an audio output device such as a speaker, notification performed by combining these, or the like.

As the process of the first example shown in FIG. 2 is performed, the uncompleted payment process is performed using the switched second communication in the information processing system 1000 when, for example, the payment process based on the first communication (an example of the process via communication) is uncompleted due to interruption of the first communication. Thus, as the process of the first example shown in FIG. 2 is performed, for example, enhancement in user convenience can be achieved.

[2] Second Example of Process Performed in Information Processing System 1000

Next, as a second example performed in the information processing system 1000, an example of a process in which the information processing terminal 200 plays a role of the information processing device according to the present embodiment and the information processing terminal 200 performs the process of the first example shown in (A) will be exemplified.

Figure 3:
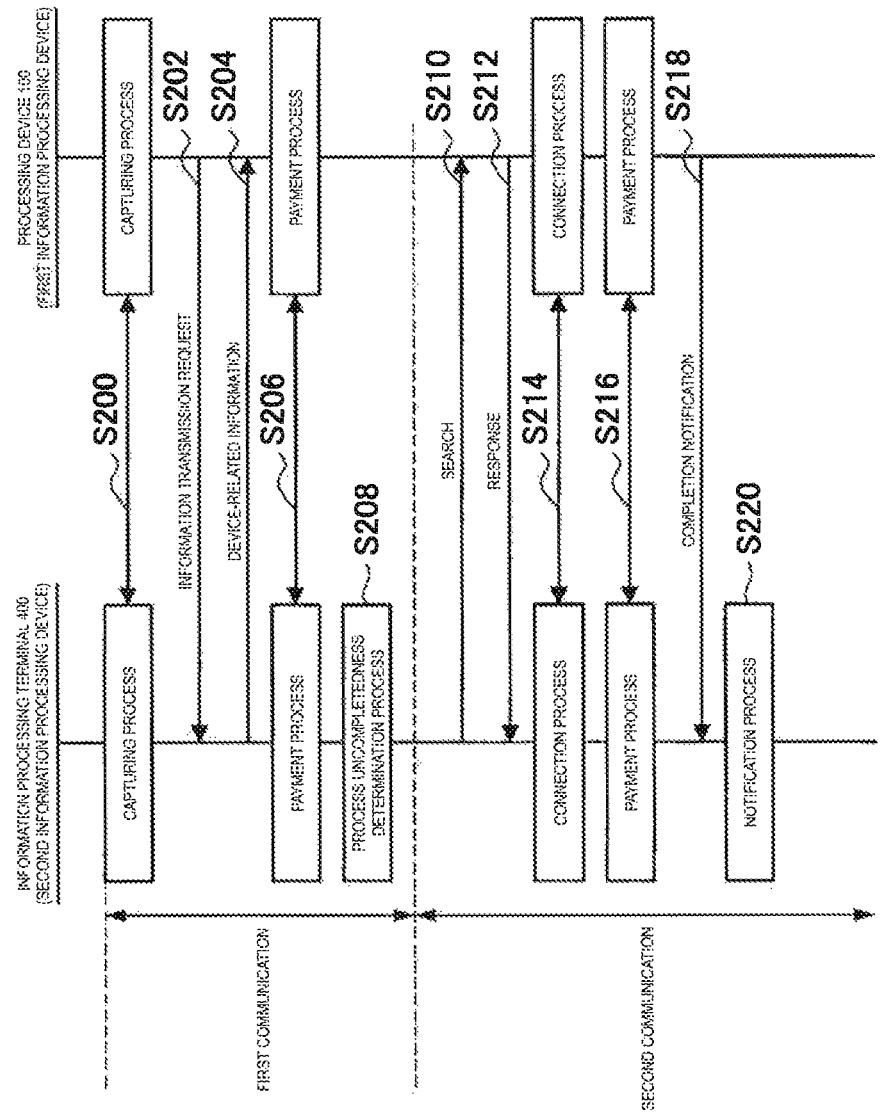
FIG. 3 is an illustrative diagram showing a second example of a process performed in the information processing system according to the first embodiment.

FIG. 3 is an illustrative diagram showing a second example of the process performed in the information processing system 1000 according to the first embodiment.

When a user of the information processing terminal 200 performs a passing-over operation and thus a distance between the information processing terminal 200 and the processing device 100 is within a communicable range of the first communication, for example, the processing device 100 and the information processing terminal 200 perform a capturing process for detecting a communication target that performs the first communication as in Step S100 of FIG. 2 (S200).

When the information processing terminal 200 has been detected in Step S200, the processing device 100 transmits a transmission request for causing device-related information to be transmitted using the first communication (S202).

The information processing terminal 200 that has received the transmission request transmitted from the processing device 100 in Step S202 transmits the device-related information using the first communication (S204).

Upon receiving the device-related information transmitted from the information processing terminal 200 in Step S204, the processing device 100 performs a payment process via the first communication (an example of the process via communication) with the information processing terminal 200 as in, for example, Step S106 of FIG. 2 (S206). In addition, in Step S206, the processing device 100 causes the information processing terminal 200 to store, for example, payment information including data indicating a process number and identification information.

Here, as the identification information included in the payment information, for example, identification information unique to the processing device 100 is exemplified. In addition, the identification information included in the payment information may be identification information common for a plurality of processing devices included in the information processing system according to the present embodiment. The payment information according to the present embodiment corresponds to device-related information corresponding to the processing device 100 (a communication target device), or device-related information corresponding to a processing device (a device equivalent to a communication target device) included in the information processing system according to the present embodiment.

When the process of Step S206 is started, for example, the information processing terminal 200 determines whether or not the payment process that has been performed is uncompleted due to interruption of the first communication (S208). When no request transmitted from the processing device 100 is detected for a set predetermined period of time, for example, before a completion notification is transmitted from the processing device 100, i.e., before the payment process is completed, the information processing terminal 200 determines that the payment process is uncompleted due to interruption of the first communication.

The information processing terminal 200 repeats the process of Step S208, for example, until the payment process is completed, or until the payment process is determined to be uncompleted due to interruption of the first communication.

When the process of Step S206 is completed, the processing device 100 and the information processing terminal 200 end the process via the first communication.

When the payment process is determined to be uncompleted due to interruption of the first communication in Step S208, the information processing terminal 200 starts the second communication using, for example, the payment information acquired in Step S206 (device-related information corresponding to the processing device 100, or the like).

The information processing terminal 200 searches for the processing device 100 using, for example, the identification information included in the acquired payment information (S210). When the processing device 100 gives a response to the search of Step S210 (S212), the processing device 100 and the information processing terminal 200 perform a connection process for the second communication, as in the process of Step S114 of FIG. 2 (S214).

When the process of Step S214 creates a state in which the second communication is possible, the processing device 100 and the information processing terminal 200 perform the uncompleted payment process of Step S206 via the second communication (S216).

Note that the uncompleted payment process of Step S206 may be performed by, for example, the server 300 included in the information processing system 1000 via the processing device 100. When the object that the information processing terminal 200 searches for is the server 300, the server 300 achieves settlement of the uncompleted payment process of Step S206 via the processing device 100 in the information processing system 1000.

When the payment process is completed in Step S216, the processing device 100 transmits a completion notification using the second communication as in Step S118 of FIG. 2 (S218).

The information processing terminal 200 that has received the completion notification transmitted from the processing device 100 in Step S218 notifies a user of the fact that the payment process has been completed as in Step S120 of FIG. 2 (S220).

As the process of the second example shown in FIG. 3 is performed, the uncompleted payment process is performed using the switched second communication in the information processing system 1000 when, for example, the payment process based on the first communication (an example of the process via communication) is uncompleted due to interruption of the first communication. Thus, as the process of the second example shown in FIG. 3 is performed, for example, enhancement in user convenience can be achieved.

[3] Third Example of Process Performed in Information Processing System 1000

Authentication using key information can be performed between devices to perform the second communication. Here, the key information can be included in the device-related information transmitted by the information processing terminal 200 to the processing device 100 using the first communication as described above; however, when the information processing terminal 200 performs communication with an unspecified processing device 100, it is considered that there are needs for setting the key information used in the second communication for one-time use.

Therefore, as a third example of the process performed in the information processing system 1000, an example of a process in which the processing device 100 can acquire key information for one-time use from the information processing terminal 200 will be exemplified. As the processing device 100 acquires the key information for one-time use, the second communication in which the key information is used is communication based on a one-time communication path.

Figure 4:
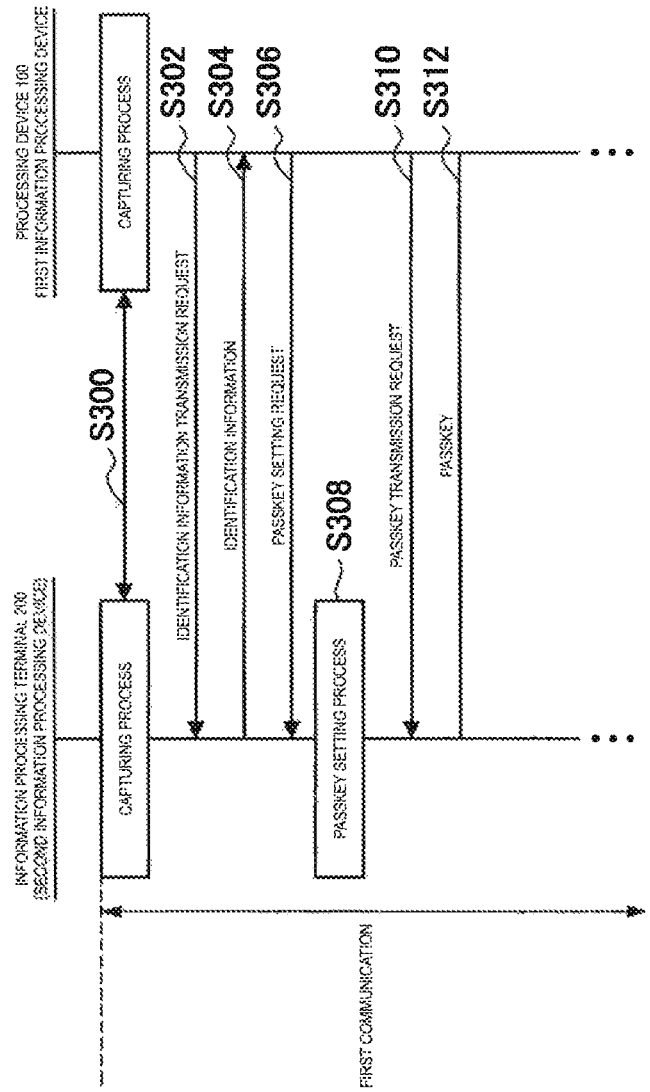
FIG. 4 is an illustrative diagram showing a third example of a process performed in the information processing system according to the first embodiment.

FIG. 4 is an illustrative diagram showing the third example of the process performed in the information processing system 1000 according to the first embodiment. In FIG. 4, key information is denoted as a "passkey."

When a user of the information processing terminal 200 performs a passing-over operation and thus a distance between the information processing terminal 200 and the processing device 100 is within a communicable range of the first communication, for example, the processing device 100 and the information processing terminal 200 perform a capturing process for detecting a communication target that performs the first communication as in Step S100 of FIG. 2 (S300).

Upon detecting the information processing terminal 200 in Step S300, the processing device 100 transmits a transmission request including a transmission command for causing identification information to be transmitted using the first communication (S302).

The information processing terminal 200 that has received the transmission request transmitted from the processing device 100 in Step S302 transmits the identification information using the first communication (S304).

The processing device 100 that has received the identification information transmitted from the information processing terminal 200 in Step S304 transmits a passkey setting request including a command for causing a process for setting a passkey to be performed or the like using the first communication (S306). Here, the passkey setting request corresponds to a generation request for causing key information to be generated.

The information processing terminal 200 that has received the passkey setting request transmitted from the processing device 100 in Step S306 sets a generated passkey by generating a passkey (S308). The information processing terminal 200 generates a random number according to the passkey setting request, and sets the passkey using, for example, an arbitrary method based on a value of the generated random number (for example, a method in which the value of the random number is set as a passkey, or the like). The information processing terminal 200 may, for example, generate random numbers uniformly, or generate random numbers in connection with the details of a process performed immediately before. In addition, the information processing terminal 200 may, for example, set a passkey automatically according to the passkey setting request, or set a passkey based on a user operation by causing a passkey setting screen, which is for allowing a user to set a passkey according to the passkey setting request, to be displayed on the display screen.

The processing device 100 transmits a transmission request including a transmission command for causing the passkey to be transmitted using the first communication (S310).

The information processing terminal 200 that has received the transmission request transmitted from the processing device 100 in Step S310 transmits the set passkey using the first communication (S312).

By receiving the passkey transmitted from the information processing terminal 200 in Step S312, the processing device 100 acquires the key information generated by the information processing terminal 200 (a communication target device) based on the passkey setting request (a generation request) using the first communication.

Thereafter, for example, the process of the first example shown in FIG. 2 (or a part of the process of the first example, for example, the process from Step S102 shown in FIG. 2, and the like), the process of the second example shown in FIG. 3 (or a part of the process of the second example, for example, the process from Step S202 shown in FIG. 3, and the like), or the like is performed between the processing device 100 and the information processing terminal 200.

As the process of the third example shown in FIG. 4 is performed, for example, the information processing terminal 200 can set the one-time use key information, and the processing device 100 can acquire the one-time use key information using the first communication in the information processing system 1000.

In addition, when the second communication is, for example, wireless communication using IEEE 802.15.1 or wireless communication using IEEE 802.11, the second communication using key information is available once wireless communication using the key information is established. As the process of the third example shown in FIG. 4 is performed, key information to be used can be set as one-time use key information, and thus the information processing system that can he more reliably used by the user of the information processing terminal 200, and the like is realized.

[4] Fourth Example of Process Performed in Information Processing System 1000

As a fourth example of a process performed in the information processing system 1000, an example of a process in which the processing device 100 plays a role of the information processing device according to the present embodiment and the process of the second example shown in (B) described above is performed in the processing device 100 will be shown.

Figure 5:
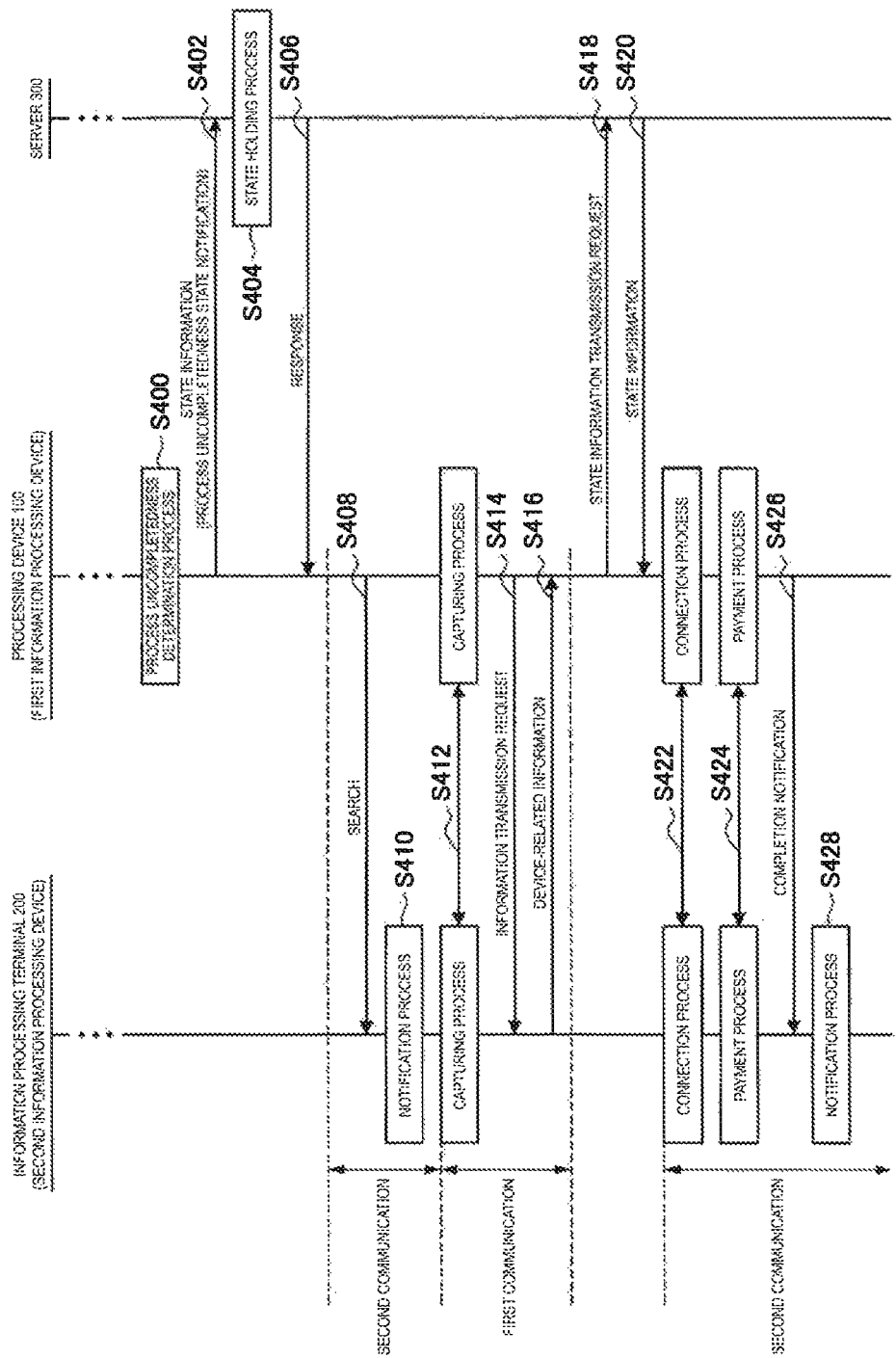
FIG. 5 is an illustrative diagram showing a fourth example of a process performed in the information processing system according to the first embodiment.

FIG. 5 is an illustrative diagram showing a fourth example of the process performed in the information processing system 1000 according to the first embodiment. In FIG. 5, an example of a process performed when a process is uncompleted even in, for example, the switched second communication is shown.

When the payment process is performed using the second communication as in Step S116 of FIG. 2, for example, the processing device 100 determines whether or not the payment process that has been performed is uncompleted due to interruption of the second communication by performing, for example, a process similar to Step S103 of FIG. 2 (S400).

When the payment process that has been performed is determined to be uncompleted due to interruption of the second communication in Step S400, the processing device 100 transmits state information indicating that the payment process corresponding to the information processing terminal 200 is uncompleted to the server 300 (S402).

Note that, although not shown in FIG. 5, the information processing terminal 200 may determine whether or not the payment process that has been performed is uncompleted due to interruption of the second communication by performing a process similar to Step S208 of FIG. 3. When it is determined whether or not the payment process is uncompleted, for example, if the payment process that has been performed is determined to be uncompleted due to interruption of the second communication, the information processing terminal 200 records state information in a storage unit (to be described below), or the like.

The server 300 that has received the state information transmitted from the processing device 100 in Step S400 holds the received state information (S402). Then, the server 300 transmits a response to the state information transmitted from the processing device 100 in Step S400 to the processing device 100 (S406).

The processing device 100 transmits, for example, a signal using the second communication to search for an external device such as the information processing terminal 200 (S408).

Upon detecting the signal transmitted from the processing device 100 using the second communication, the information processing terminal 200 determines that the processing device 100 is present within the communicable range of the second communication. In addition, the information processing terminal 200 determines whether or not there is an uncompleted process with reference to, for example, the state information stored in the storage unit (to be described below), or the like. Then, when there is an uncompleted process, the information processing terminal 200 gives the user, for example, a notification of the state of the process via communication and a notification encouraging an operation for re-performing a process of a passing-over operation or the like. The information processing terminal 200 performs such notification using an arbitrary method in which the user can be notified of that fact, for example, visual notification performed by causing text, an image, or the like to be displayed on the display screen, auditory notification performed by causing a sound (including music) to be output from an audio output device such as a speaker, notification performed by combining these, or the like.

When the user of the information processing terminal 200 performs the passing-over operation and thus a distance between the information processing terminal 200 and the processing device 100 falls within the communicable range of the first communication, for example, the processing device 100 and the information processing terminal 200 perform a capturing process for detecting a communication target performing the first communication, as in Step S100 of FIG. 2 (S412). Note that a target processing device toward which the user of the information processing terminal 200 performs the passing-over operation is not limited to the processing device 100, and it may be any other processing device constituting the information processing system according to the present embodiment. In FIG. 5, an example in which a target processing device toward which the user of the information processing terminal 200 performs the passing-over operation is the processing device 100 is exemplified.

When the information processing terminal 200 has been detected in Step S412, the processing device 100 transmits a transmission request for causing device-related information to be transmitted using the first communication (S414).

The information processing terminal 200 that has received the transmission request transmitted from the processing device 100 in Step S414 transmits the device-related information using the first communication (S416).

Upon receiving the device-related information transmitted from the information processing terminal 200 in Step S416, the processing device 100 transmits a transmission request including a transmission command requesting transmission of state information corresponding to the information processing terminal 200 to the server 300 (S418).

The server 300 that has received the transmission request transmitted from the processing device 100 in Step S418 transmits state information according to the transmission request to the processing device 100 (S420).

The processing device 100 and the information processing terminal 200 perform a connection process for performing the second communication, similarly to the process of Step S114 of FIG. 2 (S422).

When a state in which the second communication is available is created through the process of Step S422, the processing device 100 and the information processing terminal 200 perform the uncompleted payment process again using the second communication (S424). Note that the uncompleted payment process of Step S422 may be performed by, for example, the server 300 via the processing device 100.

When the payment process is completed in Step S424, the processing device 100 transmits a completion notification using the second communication as in Step S118 of FIG. 2 (S426).

The information processing terminal 200 that has received the completion notification transmitted from the processing device 100 in Step S426 notifies a user of the fact that the payment process has been completed as in Step S120 of FIG. 2 (S428).

As the process of the fourth example shown in FIG. 5 is performed, for example, even if the payment process (an example of the process via communication) is uncompleted even after the process of the first example shown in FIG. 2 in the information processing system 1000, the process via communication that is uncompleted when the first communication is performed can be performed again.

[5] Fifth Example of Process Performed in Information Processing System 1000

The process performed in the information processing system 1000 is not limited to the process of the first example shown in FIG. 2 to the process of the fourth example shown in FIG. 5. Next, as a fifth example of the process performed in the information processing system 1000, an example of a process when the information processing terminal 200 is a so-called thin client terminal will be exemplified.

Figure 6:
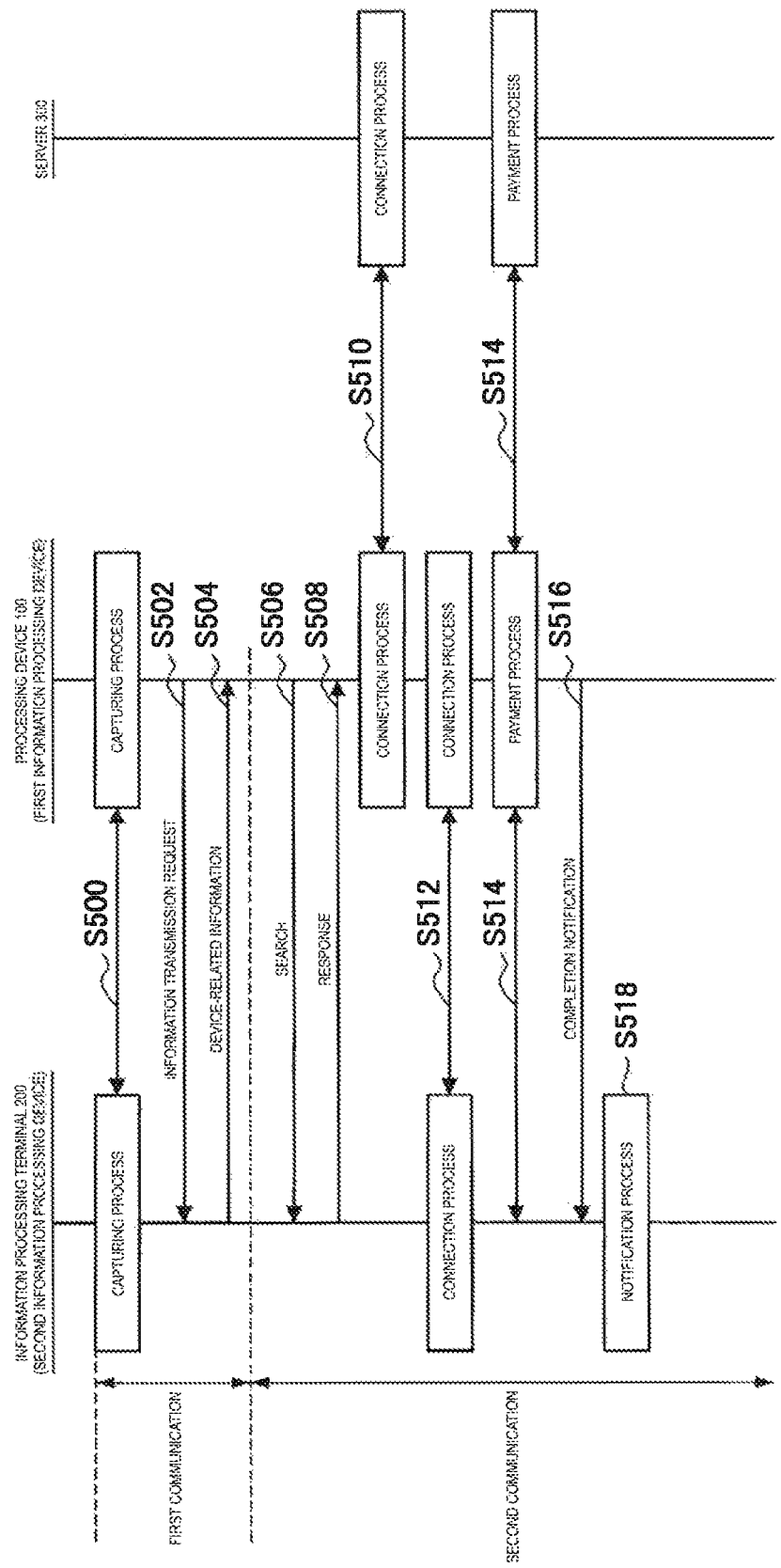
FIG. 6 is an illustrative diagram showing a fifth example of a process performed in the information processing system according to the first embodiment.

FIG. 6 is an illustrative diagram showing a fifth example of the process performed in the information processing system 1000 according to the first embodiment.

When a user of the information processing terminal 200 performs a passing-over operation and thus a distance between the information processing terminal 200 and the processing device 100 is within a communicable range of the first communication, for example, the processing device 100 and the information processing terminal 200 perform a capturing process for detecting a communication target that performs the first communication as in Step S100 of FIG. 2 (S500).

When the information processing terminal 200 has been detected in Step S500, the processing device 100 transmits a transmission request for causing device-related information to be transmitted using the first communication (S502).

The information processing terminal 200 that has received the transmission request transmitted from the processing device 100 in Step S502 transmits the device-related information using the first communication (S504).

Upon receiving the device-related information transmitted from the information processing terminal 200 in Step S504, the processing device 100 searches for the information processing terminal 200, as in Step SI 00 of FIG. 2 (S506). When the information processing terminal 200 gives a response to the search of Step S506 (S508), the processing device 100 performs a connection process with the server 300 to perform communication with the server 300 (S510). In addition, the processing device 100 performs a connection process for performing the second communication with the information processing terminal 200, as in Step S114 of FIG. 2 (S512). The connection process of Step S510 may include, for example, an authentication process of the server 300 using identification information of the processing device 100, or the like.

When a communication path between the processing device 100 and the server 300 and a communication path between the processing device 100 and the information processing terminal 200 are established through Step S510 and Step S512, the processing device 100 performs a payment process with the server 300 while, for example, acquiring appropriate data from the information processing terminal 200 (S514).

When the payment process is completed in Step S514, the processing device 100 transmits a completion notification using the second communication as in Step S118 of FIG. 2 (S516).

The information processing terminal 200 that has received the completion notification transmitted from the processing device 100 in Step S516 notifies a user of the fact that the payment process has been completed as in Step S120 of FIG. 2 (S518).

As the process of the fifth example shown in FIG. 5 is performed, for example, the payment process is realized in the information processing system 1000 even when the information processing terminal 200 is a so-called thin client terminal. Here, a processing time for thin client-type payment is easily lengthened; however, a payment process is performed through the second communication whose communicable range is wider than the first communication in the process of the fifth example shown in FIG. 5, and thus a possibility of the payment process (an example of the process via communication) being uncompleted is lowered. In addition, since the payment process is performed using the second communication whose communicable range is wider than the first communication in the process of the fifth example shown in FIG. 5, as the process of the fifth example shown in FIG. 5 is performed, a time taken to perform a passing-over operation by the user can be shortened in the information processing system 1000, and thus stable provision of services is realized.

[6] Sixth Example of Process Performed in Information Processing System 1000

A process performed in the information processing system 1000 is not limited to the process of the first example shown in FIG. 2 to the process of the fifth example shown in FIG. 6. Next, as a sixth example of the process performed in the information processing system 1000, an example of a process in which a user of the information processing terminal 200 can select a payment scheme to perform payment will be exemplified.

Figure 7:
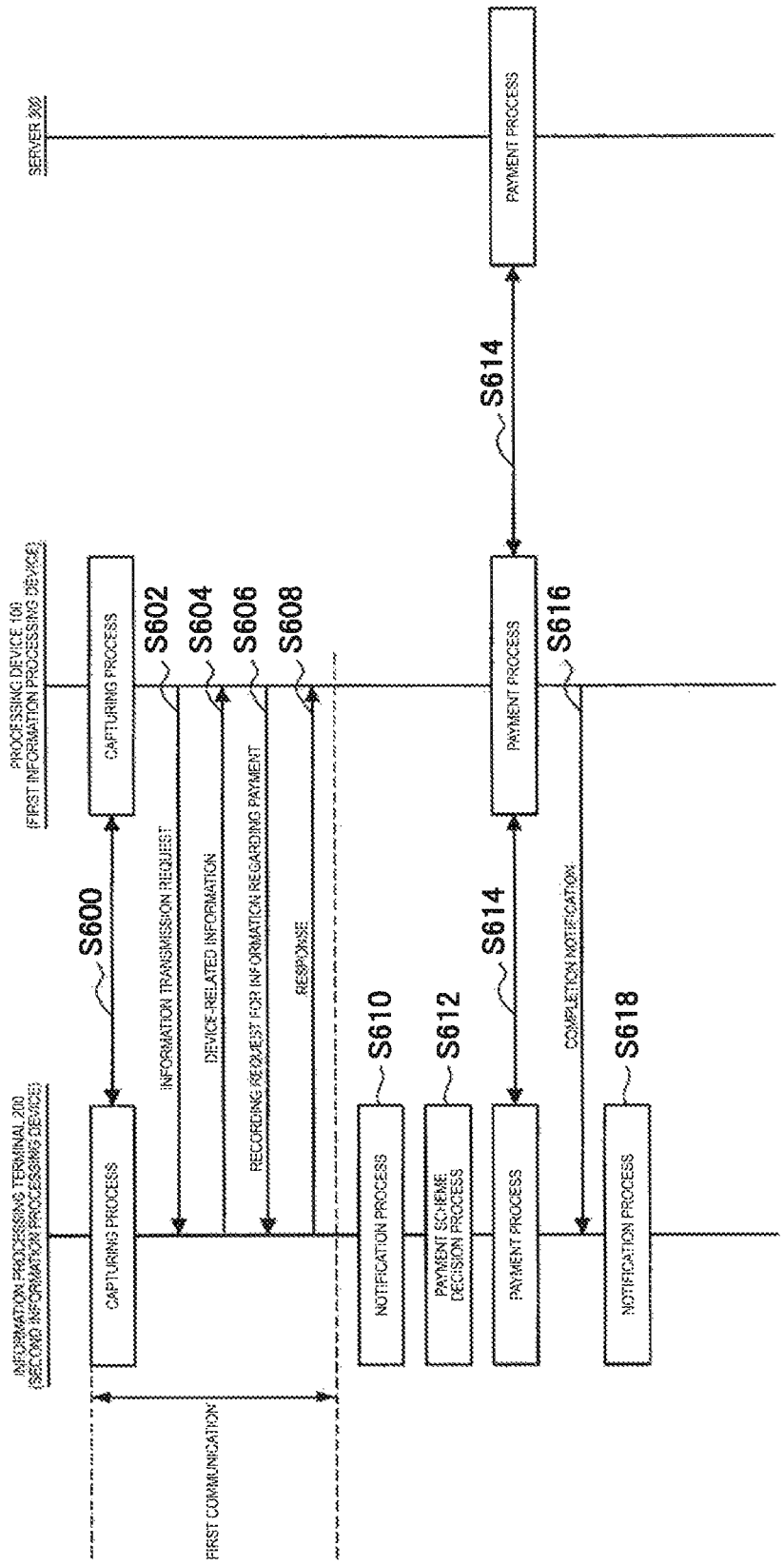
FIG. 7 is an illustrative diagram showing a sixth example of a process performed in the information processing system according to the first embodiment.

FIG. 7 is an illustrative diagram showing a sixth example of the process performed in the information processing system 1000 according to the first embodiment.

When a user of the information processing terminal 200 performs a passing-over operation and thus a distance between the information processing terminal 200 and the processing device 100 is within a communicable range of the first communication, for example, the processing device 100 and the information processing terminal 200 perform a capturing process for detecting a communication target that performs the first communication as in Step S100 of FIG. 2 (S600).

When the information processing terminal 200 has been detected in Step S600, the processing device 100 transmits a transmission request for causing device-related information to be transmitted using the first communication (S602).

The information processing terminal 200 that has received the transmission request transmitted from the processing device 100 in Step S602 transmits the device-related information using the first communication (S604).

Upon receiving the device-related information transmitted from the information processing terminal 200 in Step S604, the processing device 100 transmits, for example, a recording request including information regarding payment and a command for causing the information regarding payment to be recorded using the first communication (S606). As the information regarding payment according to the present embodiment, for example, data including an amount to be paid is exemplified, in addition, when the amount to be paid is managed by an external device such as the server 300, the information regarding payment according to the present embodiment may be data indicating a payment process number associated with the amount to be paid managed by the external device.

The information processing terminal 200 that has received the recording request transmitted from the processing device 100 in Step S606 records the information regarding payment in the storage unit (to be described below), or the like according to the recording request, and transmits a response to the recording request (S608).

The information processing terminal 200 notifies the user of the amount to be paid (S610). The information processing terminal 200 notifies the user of the amount to be paid using an arbitrary method in which the user can be notified of that fact, for example, visual notification performed by causing text, an image, or the like to be displayed on the display screen, auditory notification performed by causing a sound (including music) to be output from an audio output device such as a speaker, notification performed by combining these, or the like.

When the information regarding payment stored in the storage unit (to be described below), or the like, indicates the amount to be paid, the information processing terminal 200 notifies the user of the amount to be paid based on, for example, the information regarding payment. In addition, when amounts to be paid are managed by an external device such as the server 300, the information processing terminal 200, for example, communicates with the external device, acquires an amount to be paid corresponding to the information regarding payment stored in the storage unit (to be described below), or the like, and then notifies the user of the amount to be paid. Here, the information processing terminal 200 may communicate directly with the external device such as the server 300, or communicate therewith via a relay device (not shown).

The information processing terminal 200 decides a payment scheme (S612). The information processing terminal 200 decides a payment scheme selected by, for example, the user based on a user operation as a payment scheme to be used in a payment process. In addition, the information processing terminal 200 can, for example, select a payment scheme at random, or select a payment scheme based on a priority level given according to an arbitrary condition.

Upon deciding a payment scheme in Step S612, the information processing terminal 200 communicates with the processing device 100 or the server 300, and performs a payment process according to the payment scheme decided between the devices through which communication is being performed (S614). FIG. 7 shows an example in which the payment process is performed between the information processing terminal 200, the processing device 100, and the server 300.

When the payment process is completed in Step S614, the processing device 100 transmits a completion notification using the second communication as in Step S118 of FIG. 2 (S616).

The information processing terminal 200 that has received the completion notification transmitted from the processing device 100 in Step S616 notifies a user of the fact that the payment process has been completed as in Step S120 of FIG. 2 (S618).

As the process of the sixth example shown in FIG. 7 is performed, for example, the information processing system in which the user of the information processing terminal 200 can select a payment scheme and perform payment is realized. In addition, since the user of the information processing terminal 200 can select a payment scheme and perform payment, services that the user of the information processing terminal 200 can reliably use are realized.

Due to the information processing system 1000 according to the first embodiment, for example, the process of the first example shown in FIG. 2 to the process of the sixth example shown in FIG. 7 are realized. Note that it is a matter of course that the process performed in the information processing system 1000 is not limited to the process of the first example shown in FIG. 2 to the process of the sixth example shown in FIG. 7.

(Information Processing Device According to Present Embodiment)

Next, an example of a configuration of the information processing device according to the present embodiment which can perform the above-described process of the information processing method according to the present embodiment will be described. As the example of the configuration of the information processing device according to the present embodiment, examples of configurations of the processing device 100 (a first information processing device) and the information processing terminal 200 (a second information processing device) that constitute the information processing system 1000 according to the first embodiment shown in FIG. 1 will be exemplified.

[I] Processing Device 100

Figure 8:
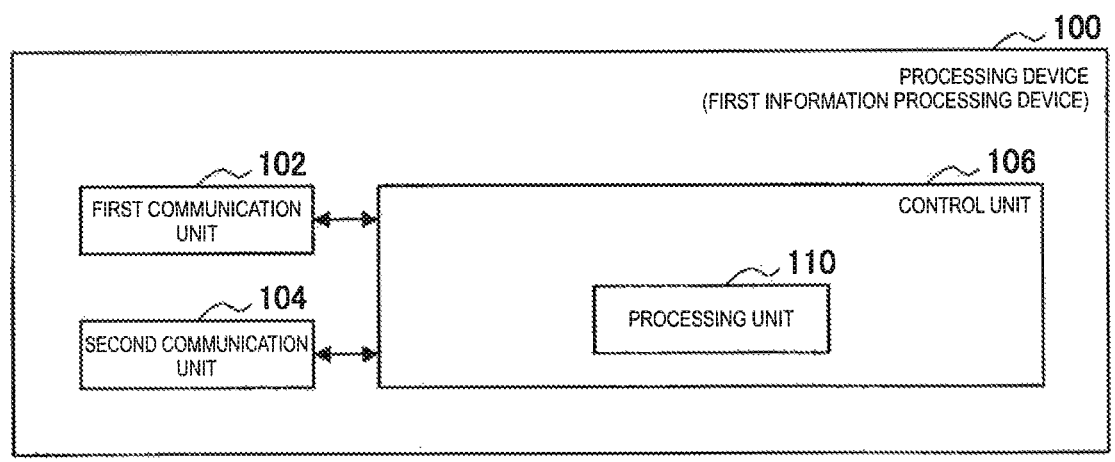
FIG. 8 is a block diagram showing an example of a configuration of a processing device according to the present embodiment.

FIG. 8 is a block diagram showing the example of the configuration of the processing device 100 according to the present embodiment. The processing device 100 is provided with, for example, a first communication unit 102, a second communication unit 104, and a control unit 106.

In addition, the processing device 100 may be provided with, for example, a read only memory (ROM; not shown), a random access memory (RAM; not shown), a storage unit (not shown), an operation unit (not shown) with which a user can perform an operation, a display unit (not shown) which displays various screens on a display screen, or the like. The processing device 100 connects the respective constituent elements with each other using, for example, a bus serving as a data transmission path.

The ROM (not shown) stores control data such as programs or operation parameters used by the control unit 106. The RAM (not shown) temporarily stores programs and the like executed by the control unit 106.

The storage unit (not shown) is a storage means provided in the processing device 100, storing, for example, data relating to the information processing method according to the present embodiment such as state information, and various types of data such as various applications. Here, as the storage unit (not shown), for example, a magnetic recording medium such as a hard disk, a non-volatile memory such as a flash memory, or the like is exemplified. In addition, the storage unit (not shown) may be detachable from the processing device 100.

As the operation unit (not shown), an operation input device to be described below is exemplified. In addition, as the display unit (not shown), a display device to be described below is exemplified.

[Example of Hardware Configuration of Processing Device 100]

Figure 9:
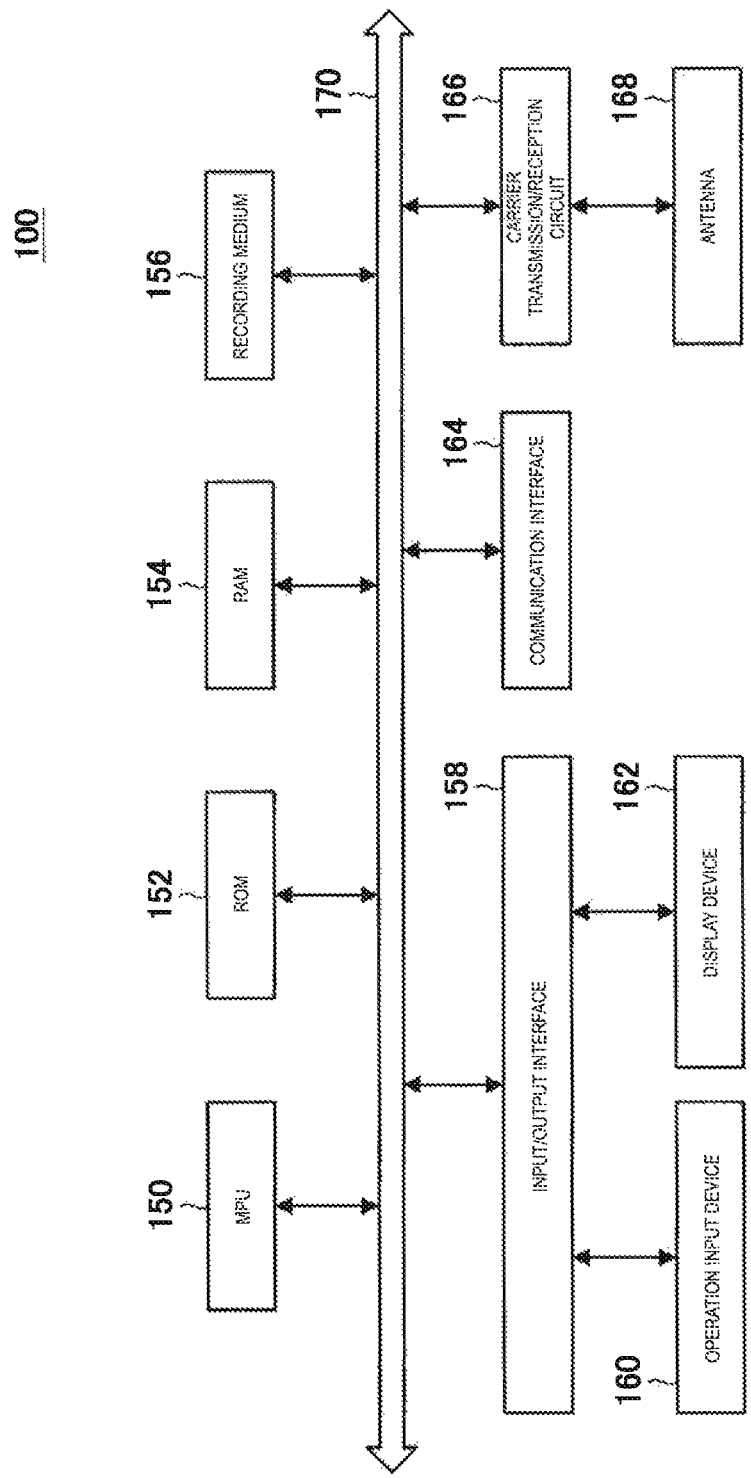
FIG. 9 is an illustrative diagram showing an example of a hardware configuration of the processing device according to the present embodiment.

FIG. 9 is an illustrative diagram showing an example of a hardware configuration of the processing device 100 according to the present embodiment. FIG. 9 shows the example of the hardware configuration of the processing device 100 when the first communication is NFC.

The processing device 100 is provided with, for example, an MPU 150, a ROM 152, a RAM 154, a recording medium 156, an input/output interface 158, the operation input device 160, the display device 162, a communication interface 164, a carrier transmission/reception circuit 166, and an antenna 168. In addition, the processing device 100 connects the respective constituent elements with each other using, for example, a bus 170 serving as a data transmission path.

The MPU 150 is constituted with, for example, one or two or more processors configured as an operation circuit such as a micro processing unit (MPU), various processing circuits, and the like, and functions as the control unit 106 controlling the processing device 100 overall. In addition, the MPU 150 plays, for example, the role of the processing unit 110 to be described below in the processing device 100.

The ROM 152 stores control data such as programs and opera parameters used by the MPU 150, and the like. The RAM 154 temporarily stores, for example, programs executed by the MPU 150, and the like.

The recording medium 156 functions as the storage unit (not shown), and stores data relating to the information processing method according to the present embodiment such as state information, and various types of data such as various applications. Here, as the recording medium 156, for example, a magnetic recording medium such as a hard disk, or a non-volatile memory such as a flash memory is exemplified. In addition, the recording medium 156 may be detachable from the processing device 100.

The input/output interface 158 connects, for example, the operation input device 160 and the display device 162. The operation input device 160 functions as the operation unit (not shown), and the display device 162 functions as the display unit (not shown). Here, as the input/output interface 158, for example, a USB terminal, a Digital Visual Interface (DVI) terminal, a High-Definition Multimedia Interface (HDMI) (registered trademark) terminal, various processing circuits, or the like is exemplified.

In addition, the operation input device 160 is, for example, provided on the processing device 100, and connected with the input/output interface 158 in the inside of the processing device 100. As the operation input device 160, for example, buttons, arrow keys, a rotation-type selector such as a jog dial, a combination thereof, or the like is exemplified.

Furthermore, the display device 162 is, for example, provided on the processing device 100, and connected with the input/output interface 158 in the inside of the processing device 100. As the display device 162, for example, a liquid crystal display, an organic electro-luminescence (EL) display (an organic EL display, which is also called an organic light emitting diode display (OLED display)), or the like is exemplified.

Note that it is a matter of course that the input/output interface 158 can he connected with an external device such as an external operation input device (for example, a keyboard, a mouse, or the like) serving as an external device of the processing device 100, or an external display device, in addition, the display device 162 may be a device on which display and user operations are possible, for example, a touch screen, or the like.

The communication interface 164 is a communication means provided in the processing device 100 to perform communication based on the second communication, and functions as the second communication unit 104. Here, as the communication interface 164, for example, an IEEE 802.15.1 port and a transmission/reception circuit, an IEEE 802.11 port and a transmission/reception circuit, or the like are exemplified.

The carrier transmission/reception circuit 166 and the antenna 168 are communication means provided in the processing device 100 to perform communication based on the first communication, and function as the first communication unit 102. The carrier transmission/reception circuit 166 and the antenna 168 function as a reader/writer in NFC.

The antenna 168 is configured with, for example, a resonance circuit constituted by a coil having predetermined inductance that serves as a transmission/reception antenna and a capacitor having predetermined electrostatic capacitance, and a demodulation circuit. In addition, when the antenna 168 receives, for example, a carrier with a frequency of 13.56 [MHz], the carrier transmission/reception circuit 166 demodulates data that has been transmitted from an external device such as the information processing terminal 200 using load modulation, or the like. Note that, when the carrier transmission/reception circuit 166 is provided with a demodulation circuit, for example, the antenna 168 may be constituted by a resonance circuit.

The carrier transmission/reception circuit 166 is provided with, for example, a modulation circuit that performs modulation, such as Amplitude Shift Keying (ASK), and an amplification circuit that amplifies output of the modulation circuit, and causes the transmission/reception antenna of the antenna 168 to transmit carriers carrying carrier signals thereon. Since the carrier transmission/reception circuit 166 is provided, the processing device 100 has the function of an initiator in NFC, and plays a role of a so-called reader/writer. Here, as a carrier signal transmitted by the carrier transmission/reception circuit 166 from the antenna 168, for example, a polling signal, a signal indicating various kinds of data such as distribution information, or the like is exemplified. In addition, transmission of carriers of the carrier transmission/reception circuit 166 is, for example, controlled by the MPU 150.

Furthermore, the carrier transmission/reception circuit 166 may be provided with, for example, a demodulation circuit that demodulates signals received by the antenna 168. The demodulation circuit detects envelope curves of amplitude variation of a voltage occurring between, for example, the modulation circuit (or the amplification circuit) and the resonance circuit of the antenna 168, binarizes detected signals, and thereby demodulates the signals received by the antenna 168. Note that the demodulation circuit can also demodulate the signals received by the antenna 168 using, for example, phase variation of a voltage occurring between the modulation circuit (or the amplification circuit) and the resonance circuit of the antenna 168.

The processing device 100 performs the process of the information processing method according to the present embodiment with, for example, the configuration shown in FIG. 9. Note that a hardware configuration of the processing device 100 according to the present embodiment is not limited to the configuration shown in FIG. 9.

When the second communication with an external device is performed via a connected external communication device that can communicate based on the second communication, for example, the processing device 100 may not be provided with the communication interface 164.

In addition, when the first communication is not NFC, the processing device 100 may not be provided with the carrier transmission/reception circuit 166 and the antenna 168. In addition, when the first communication is not NFC, the processing device 100 may be further provided with a first communication-enabled communication device such as an infrared communication device.

In addition, when the first communication with an external device is performed via a connected external communication device that can communicate based on the first communication, the processing device 100 may not be provided with a first communication-enabled communication device, such as the carrier transmission/reception circuit 166 and the antenna 168.

Further, the processing device 100 may be further provided with other communication devices, for example, a LAN terminal and a transmission/reception circuit, a communication antenna such as an antenna for LTE/3G and radio frequency (RF), or the like.

In addition, the processing device 100 can also have a configuration in which, for example, the recording medium 156, the operation input device 160, or the display device 162 is not provided, Further, the configuration shown in FIG. 9 (or a configuration according to a modified example thereof) may be realized with, for example, one, or two or more integrated circuits (ICs).

The example of the configuration of the processing device 100 will be described with reference to FIG. 8 again.

The first communication unit 102 communicates with external devices using the first communication. The first communication of the first communication unit 102 is controlled by, for example, the control unit 106.

Here, as the first communication unit 102, for example, an NFC-applicable communication device such as the carrier transmission/reception circuit 166 and the antenna 168 shown in FIG. 9, an infrared communication device, and the like are exemplified.

The second communication unit 104 communicates with external devices using the second communication. The second communication of the second communication unit 104 is controlled by, for example, the control unit 106.

Here, as the second communication unit 104, for example, an IEEE 802.15.1 port and a transmission/reception circuit, an IEEE 802.11 port and a transmission/reception circuit, and the like are exemplified.

The control unit 106 is configured as, for example, an MPU or the like, playing a role of controlling the processing device 100 overall. In addition, the control unit 106 is provided with, for example, the processing unit 110, playing a leading role of performing the process of the information processing method according to the present embodiment.

The processing unit 110 plays a leading role of performing the process of the information processing method according to the present embodiment. The processing unit 110 acquires device-related information from a communication target device when the first communication with the communication target device is started. In addition, the processing unit 110 performs a process via communication with the communication target device using the first communication or the second communication.

More specifically, the processing unit 110 performs, for example, the process of the first example shown in (A), or the process of the second example shown in (B). In addition, when the first communication with a communication target device such as the information processing terminal 200 is started, the processing unit 110 may transmit a generation request for generating key information to the communication target device, and acquire the key information generated by the communication target device using the first communication as shown in, for example, FIG. 4.

In addition, the processing unit 110 can also perform, for example, the process of the processing device 100 executed in the process of the sixth example shown in FIG. 6, or the process of the processing device 100 executed in the process of the sixth example shown in FIG. 7.

Since the control unit 106 is provided with, for example, the processing unit 110, it initiatively performs the process of the information processing method according to the present embodiment.

With the configuration shown in FIG. 8, for example, the processing device 100 performs the process of the information processing method according to the present embodiment.

Thus, the processing device 140 can, for example, achieve enhancement in user convenience with the configuration shown in FIG. 8.

In addition, with the configuration shown in FIG. 8, for example, the processing device 100 can exhibit effects exhibited by performing the process of the information processing method according to the present embodiment, for example, as described above.

Note that a configuration of the processing device (a first information processing device) according to the present embodiment is not limited to the configuration shown in FIG. 8.

The processing device according to the present embodiment, for example, can be provided with the processing unit 110 separately from the control unit 106 (for example, to be realized in a different processing circuit). In addition, the processing device according to the present embodiment may be configured such that processes performed by the processing unit 110 are performed in a plurality of processing circuits.

In addition, when the first communication with an external device is performed via a connected external communication device that can communicate based on the first communication, for example, the processing device according to the present embodiment may not be provided with the first communication unit 102.

Further, when the second communication with an external device is performed via a connected external communication device that can communicate based on the second communication, for example, the processing device according to the present embodiment may not be provided with the second communication unit 104.

[II] Information Processing Terminal 200

Figure 10:
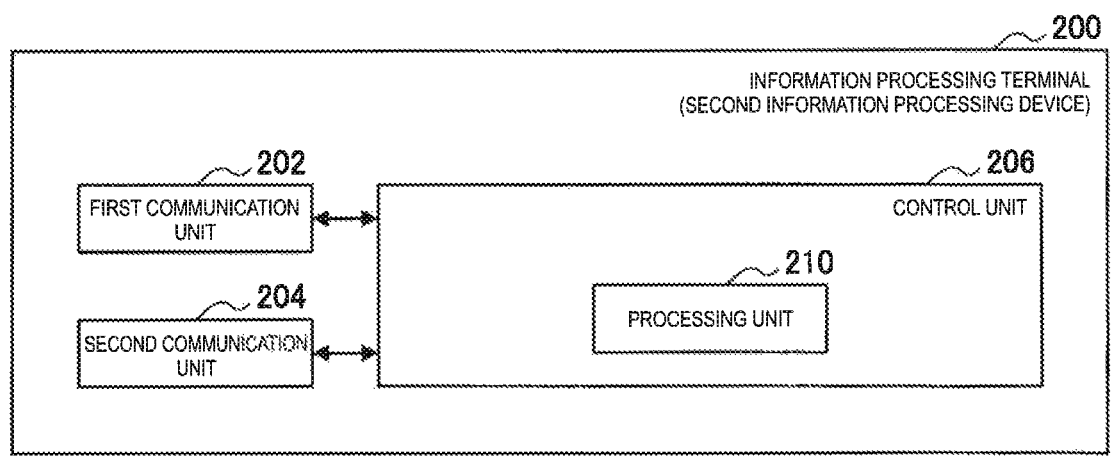
FIG. 10 is a block diagram showing an example of a configuration of an information processing terminal according to the present embodiment.

FIG. 10 is a block diagram showing an example of a configuration of the information processing terminal 200 according to the present embodiment. The information processing terminal 200 is provided with, for example, a first communication unit 202, a second communication unit 204, and a control unit 206.

In addition, the information processing terminal 200 may be provided with, for example, a ROM (not shown), a RAM (not shown), a storage unit (not shown), an operation unit (not shown) with which a user can perform an operation, a display unit (not shown) which displays various screens such as a screen for notification, a passkey setting screen on a display screen, and the like. The information processing terminal 200 connects the respective constituent elements with each other using, for example, a bus serving as a data transmission path.

The ROM (not shown) stores control data such as programs or operation parameters used by the control unit 206. The RAM (not shown) temporarily stores programs and the like executed by the control unit 206.

The storage unit (not shown) is a storage means provided in the information processing terminal 200, and stores, for example, data relating to the information processing method according to the present embodiment such as state information, and various types of data such as various applications. Here, as the storage unit (not shown), for example, a magnetic recording medium such as a hard disk, a non-volatile memory such as a flash memory, or the like is exemplified. In addition, the storage unit (not shown) may be detachable from the information processing terminal 200.

As the operation unit (not shown), an operation input device to be described below is exemplified. In addition, as the display unit (not shown), a display device to be described below is exemplified.

[Example of Hardware Configuration of Information Processing Terminal 200]

Figure 11:
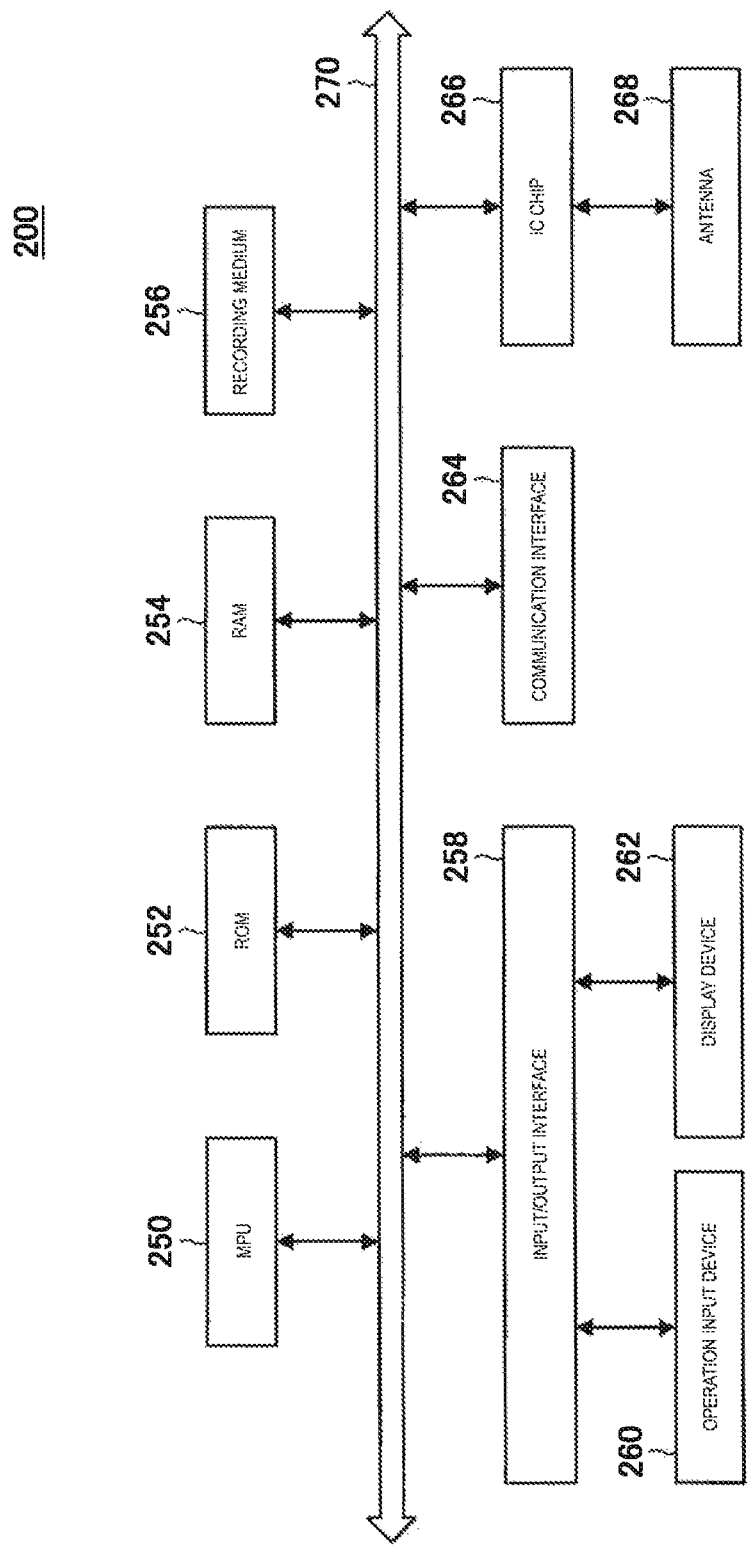
FIG. 11 is an illustrative diagram showing an example of a hardware configuration of the information processing terminal according to the present embodiment.

FIG. 11 is an illustrative diagram showing an example of a hardware configuration of the information processing terminal 200 according to the present embodiment. FIG. 11 shows the example of the hardware configuration of the information processing terminal 200 when the first communication is NFC.

The information processing terminal 200 is provided with, for example, an MPU 250, a ROM 252, a RAM 254, a recording medium 256, an input/output interface 258, an operation input device 260, a display device 262, a communication interface 264, an IC chip 266, and an antenna 268. In addition, the information processing terminal 200 connects the respective constituent elements with each other using, for example, a bus 270 serving as a data transmission path.

The MPU 250 is constituted with, for example, one or two or more processors configured as an operation circuit such as an MPU, various processing circuits, and the like, and functions as the control unit 206 controlling the information processing terminal 200 overall. In addition, the MPU 250 plays, for example, the role of the processing unit 210 to be described below in the information processing terminal 200.

The ROM 252 stores control data such as programs and operation parameters used by the MPU 250, and the like. The RAM 254 temporarily stores, for example, programs executed by the MPU 250, and the like.

The recording medium 256 functions as the storage unit (not shown), and stores data relating to the information processing method according to the present embodiment such as state information, and various types of data such as various applications. Here, as the recording medium 256, for example, a magnetic recording medium such as a hard disk, or a non-volatile memory such as a flash memory is exemplified. In addition, the recording medium 256 may be detachable from the information processing terminal 200.

The input/output interface 258 connects, for example, the operation input device 260 and the display device 262. The operation input device 260 functions as the operation unit (not shown), and the display device 262 functions as the display unit (not shown). Here, as the input/output interface 258, for example, a USB terminal, a DVI terminal, an HDMI (registered trademark) terminal, various processing circuits, or the like is exemplified.

In addition, the operation input device 260 is, for example, provided on the information processing terminal 200, and connected with the input/output interface 258 in the inside of the information processing terminal 200. As the operation input device 260, for example, buttons, arrow keys, a rotation-type selector such as a jog dial, a combination thereof, or the like is exemplified.

In addition, the display device 262 is, for example, provided on the information processing terminal 200, and connected with the input/output interface 258 in the inside of the information processing terminal 200. As the display device 262, for example, a liquid crystal display, an organic EL display, or the like is exemplified.

Note that it is a matter of course that the input/output interface 258 can be connected with an external device such as an external operation input device (for example, a keyboard, a mouse, or the like) serving as an external device of the information processing terminal 200, or an external display device. In addition, the display device 262 may be a device on which display and user operations are possible, for example, a touch screen, or the like.

The communication interface 264 is a communication means provided in the information processing terminal 200 to perform communication based on the second communication, and functions as the second communication unit 204. The communication interface 264 performs communication with an external device, for example, the processing device 100, or the like.

Here, as the communication interface 264, for example, an IEEE 802.15.1 port and a transmission/reception circuit, an IEEE 802.11 port and a transmission/reception circuit, or the like are exemplified. In addition, the communication interface 264 is, for example, a device compatible with the communication interface 164 provided in processing device 100 in terms of communication scheme.

The IC chip 266 and the antenna 268 are communication means provided in the information processing terminal 200 to perform communication based on the first communication. The IC chip 266 and the antenna 268 perform communication based on NFC with a reader/writer or an external device having a reader/writer function using a carrier with a predetermined frequency, for example, 13.56 [MHz]. The antenna 268 plays a role of receiving carriers and transmitting response signals. In addition, the IC chip 266 demodulates and processes carrier signals transmitted from an external device such as a reader/writer based on received carriers, and causes response signals to be transmitted using load modulation.

Figure 12:
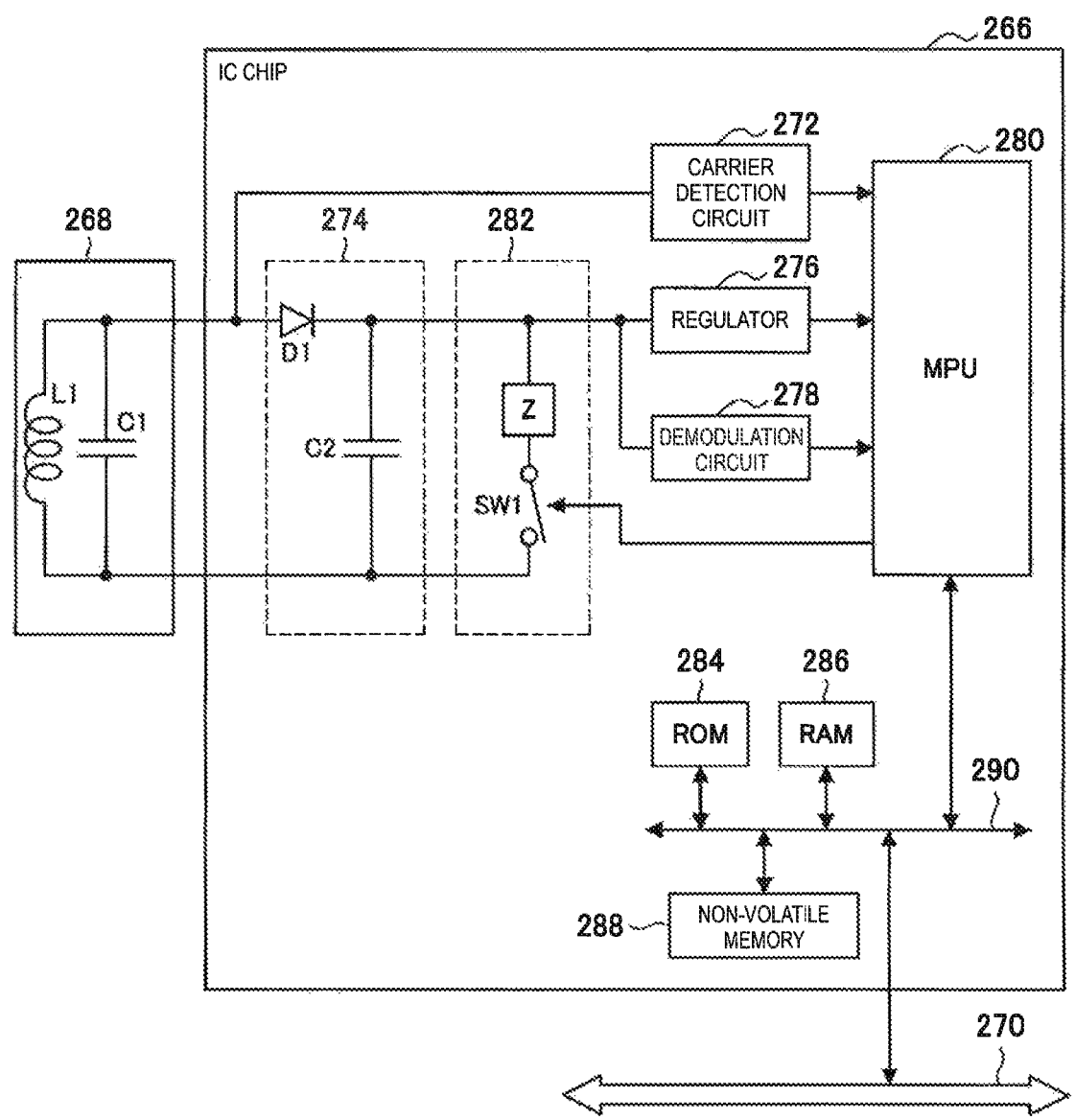
FIG. 12 is an illustrative diagram showing an example of a configuration of an IC chip and an antenna shown in FIG. 11.

FIG. 12 is an illustrative diagram showing an example of a configuration of the IC chip 266 and the antenna 268 shown in FIG. 11. Note that the information processing terminal 200 may not have the configuration of the IC chip 266 shown in FIG. 12, for example, in the form of an IC chip.

The antenna 268 is configured with, for example, a resonance circuit constituted by a coil (inductor) L1 having predetermined inductance and a capacitor C1 having predetermined electrostatic capacitance, and generates an inductive voltage using electromagnetic induction according to reception of carriers. In addition, the antenna 268 outputs a reception voltage obtained by resonating the inductive voltage at a predetermined resonance frequency. Here, the predetermined resonance frequency of the antenna 268 is set according to, for example, the frequency of a carrier such as 13.56 [MHz]. With this configuration, the antenna 268 receives carriers, and transmits response signals using load modulation performed in a load modulation circuit 282 provided in the IC chip 266.

The IC chip 266 is provided with a carrier detection circuit 272, a detector circuit 274, a regulator 276, a demodulation circuit 278, an MPU 280, and the load modulation circuit 282. Note that, although not shown in FIG. 12, the IC chip 266 may be further provided with, for example, a protection circuit (not shown) for preventing overvoltage or overcurrent from being applied to the MPU 280. Here, as the protection circuit (not shown), for example, a clamp circuit constituted by a diode and the like is exemplified.

Further, the IC chip 266 is provided with, for example, a ROM 284, a RAM 286, and a non-volatile memory 288. The MPU 280, the ROM 284, the RAM 286, and the non-volatile memory 288 are connected with each other via, for example, a bus 290 serving as a data transmission path. In addition, the bus 290 is connected with the bus 270.

The ROM 284 stores control data such as programs and operation parameters used by the MPU 280. The RAM 286 temporarily stores programs executed by the MPU 280, operation results, an execution state, and the like.

The non-volatile memory 288 stores, for example, information regarding payment, or various kinds of data such as electronic values, or various applications. In addition, state information may be stored in the non-volatile memory 288. Here, as the non-volatile memory 288, for example, an electrically erasable and programmable read only memory (EEPROM), a flash memory, or the like is exemplified. In addition, the non-volatile memory 288 may have, for example, tamper resistance.

The carrier detection circuit 272 generates a rectangular detection signal based on, for example, a reception voltage delivered from the antenna 268, and delivers the detection signal to the MPU 280. The MPU 280 uses the delivered detection signal as, for example, a processing clock for data processing. Here, since the detection signal is based on the reception voltage delivered from the antenna 268, it is synchronized with the frequency of a carrier transmitted from an external device such as a reader/writer (or a device playing a role of a reader/writer). Thus, with the carrier detection circuit 272 provided, the IC chip 266 can perform a process performed with an external device such as a reader/writer (or a device playing a role of a reader/writer) in synchronization with the external device.

The detector circuit 274 commutates the reception voltage output from the antenna 268. Here, the detector circuit 274 is constituted by, for example, a diode D1 and a capacitor C2.

The regulator 276 smoothly turns the reception voltage into a constant voltage to output a drive voltage to the MPU 280. Here, the regulator 276 uses DC components of the reception voltage as the drive voltage.

The demodulation circuit 278 demodulates the carrier signal based on the reception voltage, and outputs data corresponding to the carrier signal included in the carrier (for example, a data signal binarized to a high level and a low level). Here, the demodulation circuit 278 outputs AC components of the reception voltage as data.

The MPU 280 is driven using, for example, the drive voltage output from the regulator 276 as a power source, and performs processes of the data demodulated by the demodulation circuit 278. Here, the MPU 280 is constituted by, for example, one or two or more processors configured as an operation circuit such as an MPU, various processing circuits, and the like.

In addition, the MPU 280 selectively generates a control signal for controlling load modulation relating to a response to an external device such as a reader/writer (or a device playing a role of a reader/writer) according to a process result. Then, the MPU 280 selectively outputs the control signal to the load modulation circuit 282.

The load modulation circuit 282 is provided with, for example, a load Z and a switch SW1, and performs load modulation by selectively connecting (activating) the load Z according to a control signal delivered from the MPU 280. Here the load Z is configured with, for example, a resistance having a predetermined resistance value. In addition, the switch SW1 is configured with, for example, a p-channel metal oxide semiconductor field effect transistor (MOSFET), or an n-channel MOSFET.

With the configuration described above, the IC chip 266 can process the carrier signal received by the antenna 268, and cause the antenna 268 to transmit a response signal using load modulation.

Since the IC chip 266 and the antenna 268 have the configuration shown in FIG. 12, for example, they perform communication with an external device such as a reader/writer (or a device playing a role of a reader/writer) based on NFC using a carrier having a predetermined frequency. Note that it is a matter of course that a configuration of the IC chip 266 and the antenna 268 according to the present embodiment is not limited to the example shown in FIG. 12.

With the configuration shown in FIG. 11, for example, the information processing terminal 200 performs the process of the information processing method according to the present embodiment described above. Note that a hardware configuration of the information processing terminal 200 according to the present embodiment is not limited to the configuration shown in FIG. 11.

The information processing terminal 200 may be further provided with, for example, a carrier transmission/reception circuit electrically connected with the antenna 268 (for example, the carrier transmission/reception circuit 166 shown in FIG. 9), and may have a reader/writer function for NFC.

In addition, when the first communication is not NFC, the information processing terminal 200 may not be provided with the IC chip 266 and the antenna 268. In addition, when the first communication is not NFC, the information processing terminal 200 may be further provided with a first communication-enabled communication device such as an infrared communication device.

In addition, when the first communication with an external device is performed via a connected external communication device that can communicate based on the first communication, the information processing terminal 200 may not be provided with a second communication-enabled communication device, such as the IC chip 266 and the antenna 268.

When the second communication with an external device is performed via a connected external communication device that can communicate based on the second communication, for example, the information processing terminal 200 may not be provided with the communication interface 264.

In addition, the information processing terminal 200 may be further provided with other communication devices, for example, a communication antenna such as an LTE/3G antenna, an RF circuit, and the like.

Further, the information processing terminal 200 may be configured not to be provided with, for example, one or two or more of the recording medium 256, the operation input device 260, and the display device 262. Note that, when an external display device is connected to the information processing terminal 200, for example, the information processing terminal 200 can cause the external display device to display various screens such as a screen for notification, or a passkey setting screen, regardless of the fact that the display device 262 is provided.

In addition, the information processing terminal 200 may be further provided with, for example, an audio output device that outputs sounds (including music). As the audio output device according to the present embodiment, for example, a speaker is exemplified. In addition, the audio output device according to the present embodiment may further have a digital signal processor (DSP) that processes audio signals, an amplifier that amplifies audio signals, and the like.

When the audio output device is provided, the information processing terminal 200 causes, for example, a sound (including music) indicating the details of various notifications such as a completion notification to be output from the audio output device. Note that, when an external audio output device is connected to the information processing terminal 200, for example, the information processing terminal 200 can also cause the external audio output device to output a sound (including music) indicating the details of various notifications such as a completion notification, regardless of whether an audio output device is provided.

In addition, the configuration shown in FIG. 11 (or a configuration according to a modified example thereof) may be realized with, for example, one or two or more ICs.

The example of the configuration of the information processing terminal 200 will be described again with reference to FIG. 10. The first communication unit 202 communicates with an external device using the first communication. The first communication of the first communication unit 202 is controlled by, for example, the control unit 206.

Here, as the first communication unit 202, for example, an NFC-applicable communication device such as the IC chip 266 and the antenna 268 shown in FIG. 11, an infrared communication device, and the like are exemplified.

The second communication unit 204 communicates with external devices using the second communication. The second communication of the second communication unit 204 is controlled by, for example, the control unit 206.

Here, as the second communication unit 204, for example, an IEEE 802.15.1 port and a transmission/reception circuit, an IEEE 802.11 port and a transmission/reception circuit, and the like are exemplified.

The control unit 206 is configured as, for example, an MPU or the like, playing a role of controlling the information processing terminal 200 overall. In addition, the control unit 206 is provided with, for example, the processing unit 210, playing a leading role of performing the process of the information processing method according to the present embodiment.

The processing unit 210 plays a leading role of performing the process of the information processing method according to the present embodiment. The processing unit 210 acquires device-related information from a communication target device when the first communication with the communication target device is started. In addition, the processing unit 210 performs a process via communication with the communication target device using the first communication or the second communication.

More specifically, the processing unit 210 performs, for example, the process of the first example shown in (A), or the process of the second example shown in (B).

Since the control unit 206 is provided with, for example, the processing unit 210, it initiatively performs the process of the information processing method according to the present embodiment.

With the configuration shown in FIG. 10, for example, the information processing terminal 200 performs the process of the information processing method according to the present embodiment.

Thus, the information processing terminal 200 can, for example, achieve enhancement in user convenience with the configuration shown in FIG. 10.

In addition, with the configuration shown in FIG. 10, for example, the processing device 100 can exhibit effects exhibited by performing the process of the information processing method according to the present embodiment, for example, as described above.

Note that a configuration of the information processing terminal (a second information processing device) according to the present embodiment is not limited to the configuration shown in FIG. 10.

The information processing terminal according to the present embodiment, for example, can be provided with the processing unit 210 separately from the control unit 206 (for example, to be realized in a different processing circuit). In addition, the information processing terminal according to the present embodiment may be configured such that processes performed by the processing unit 210 are performed in a plurality of processing circuits.

In addition, when the first communication with an external device is performed via a connected external communication device that can communicate based on the first communication, for example, the information processing terminal according to the present embodiment may not be provided with the first communication unit 202.

In addition, when the second communication with an external device is performed via a connected external communication device that can communicate based on the second communication, for example, the information processing terminal according to the present embodiment may not be provided with the second communication unit 204.

Although the processing device (the first information processing device) has been described as a device that can perform the process of the information processing method according to the present embodiment above, the present embodiment is not limited thereto. The present embodiment can be applied to various apparatuses, for example, devices as shown in FIG. 1 (for example, devices relating to a point-of-sale (POS) and the like) installed in stores, computers such as personal computers (PCs) and servers, communication devices such as smartphones and mobile telephones, tablet-type devices, and the like. In addition, the present embodiment can also be applied to, for example, processing ICs that can be incorporated into such apparatuses described above.

In addition, although the information processing terminal (the second information processing device) has been described as a device that can perform the process of the information processing method according to the present embodiment, the present embodiment is not limited thereto. The present embodiment can be applied to various apparatuses, for example, communication devices as shown in FIG. 1 such as smartphones and mobile telephones, IC cards, tablet-type devices, computers such as PCs, video/music reproduction devices (or video/music recording/reproduction devices), game devices, and the like. In addition, the present embodiment can also be applied to, for example, processing ICs that can be incorporated into such apparatuses described above.

(Program According to Present Embodiment)

Enhancement in user convenience can be achieved by a processor or the like of a computer executing a program for causing the computer to function as the information processing device according to the present embodiment (for example, a program that can execute the process of the information processing method according to the present embodiment). As the program for causing a computer to function as the information processing device according to the present embodiment, for example, a program for causing a computer to function as the processing device (the first information processing device) according to the present embodiment, or a program for causing a computer to function as the information processing terminal (the second information processing device) according to the present embodiment is exemplified.

In addition, when the program for causing a computer to function as the information processing device according to the present embodiment is executed by a processor or the like in the computer, effects exhibited through the above-described process of the information processing method according to the present embodiment can be exhibited.

(Information Processing System According to Second Embodiment)

Next, an information processing system that can give various notifications on the process via communication to a user will be described as an information processing system according to a second embodiment. An example in which the process via communication is a payment process will be mainly described below.

Note that a notification method according to the present embodiment introduced by exemplifying the information processing system according to the second embodiment can be applied to the information processing system according to the first embodiment described above as well.

Figure 13:
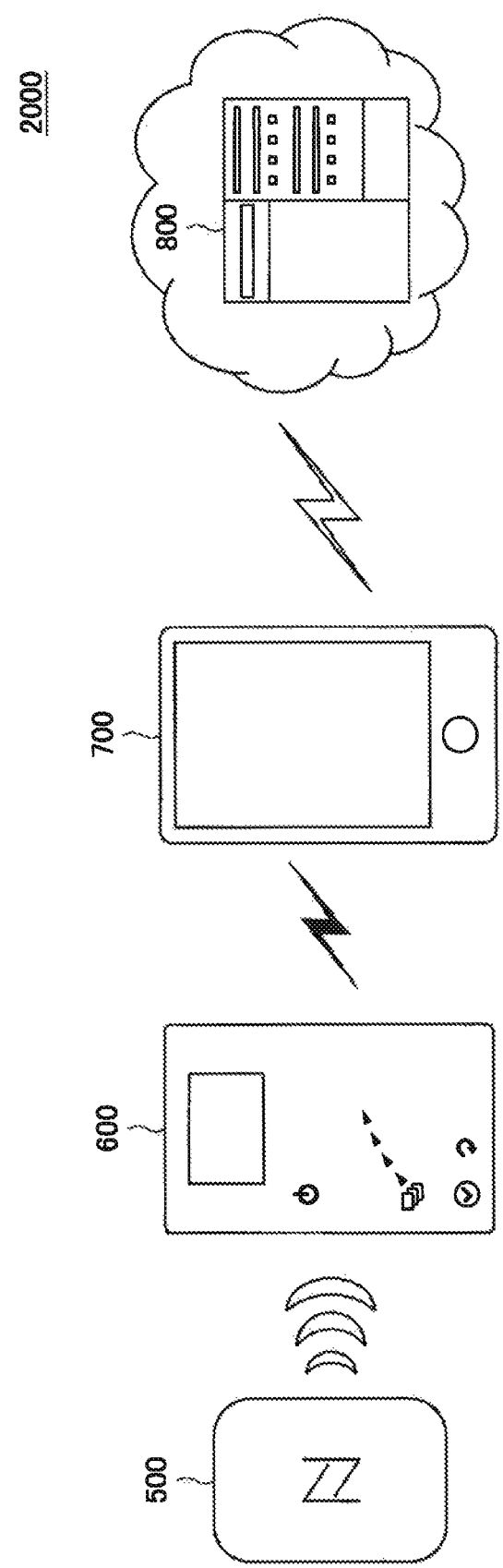
FIG. 13 is an illustrative diagram showing an example of an information processing system according to a second embodiment.

FIG. 13 is an illustrative diagram showing an example of the information processing system 2000 according to the second embodiment.

The information processing system 2000 has a reader/writer 500, an information processing device 600, another information processing device 700, and a server 800. Here, FIG. 13 shows an example in which the information processing device 600 is an IC card and the information processing device 700 is a communication device such as a smartphone.

The reader/writer 500 performs communication with the information processing device 600 based on, for example, NFC. In addition, the information processing device 600 and the information processing device 700 perform wireless communication with each other using, for example, IEEE 802.15.1 or IEEE 802.11. The information processing device 700 and the server 800 perform communication with each other, for example, via a network (or directly).

The notification method according to the present embodiment will be described below exemplifying the information processing system 2000 shown in FIG. 13. Note that, although an example of visual notification performed by displaying an image, text, or the like on a display screen will be mainly described below, notification relating to the notification method according to the present embodiment is not limited to visual notification. Notification relating to the notification method according to the present embodiment may be, for example, auditory notification using a sound (including music), tactual notification using vibration or the like, or notification performed by combining two or more of the visual notification, auditory notification, and tactual notification.

Figure 14:
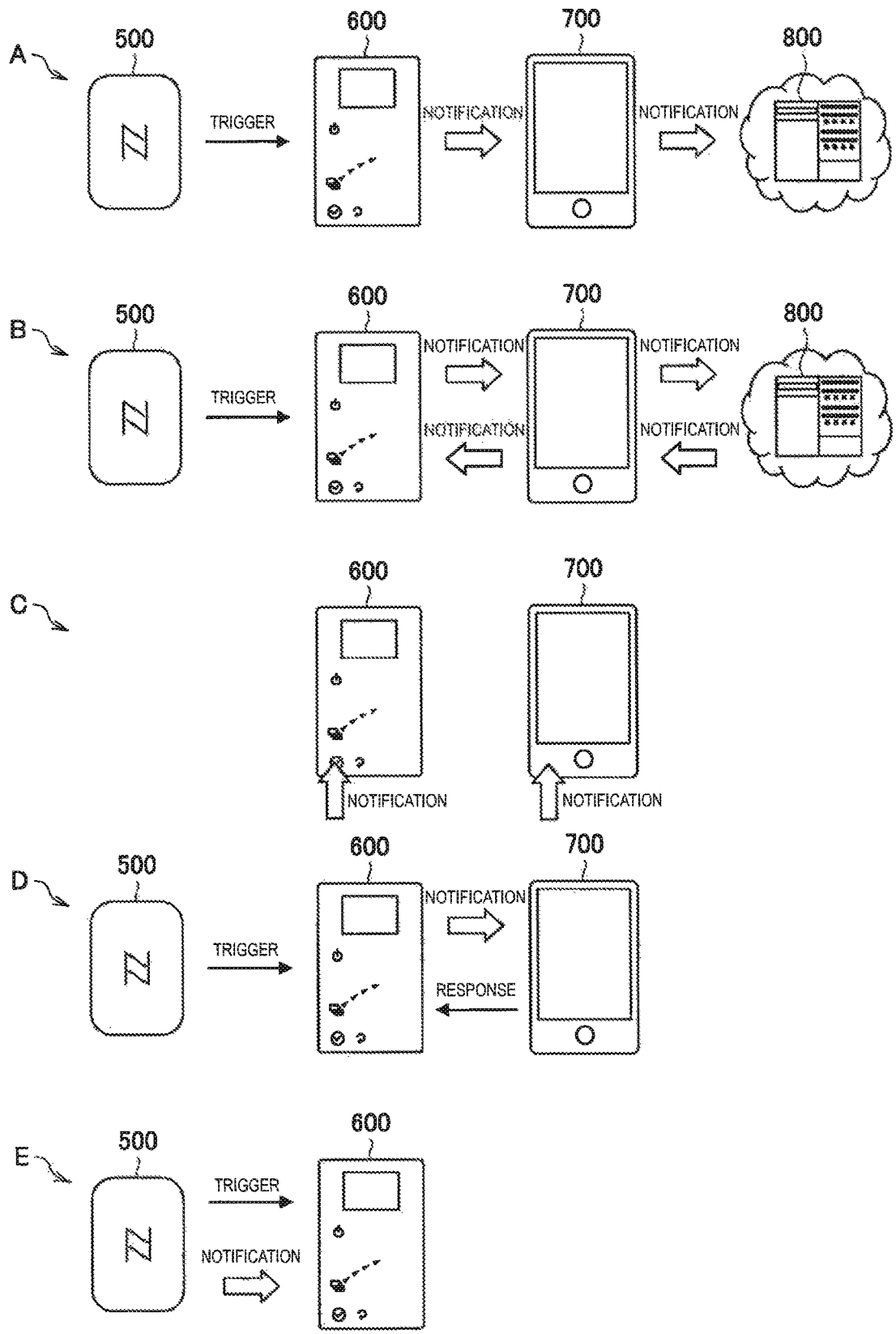
FIG. 14 is an illustrative diagram for describing a notification method according to the present embodiment.

FIG. 14 is an illustrative diagram for describing the notification method according to the present embodiment. A of FIG. 14 to E of FIG. 14 show notification patterns realized with the notification method according to the present embodiment. Examples of the notification patterns realized with the notification method according to the present embodiment will be described below appropriately referring to FIG. 14.

(1) First Notification Pattern (A of FIG. 14)

When the payment process between the reader/writer 500 and the information processing device 600 is completed, the information processing device 600 transmits information indicating the details of payment (data; which will be referred to as "payment information" below) to the information processing device 700 to notify the information processing device 700 of the details of payment. In addition, the information processing device 700, far example, transmits the payment information acquired from the information processing device 600 to the server 800 to notify the server 800 of the details of payment.

Figure 15:
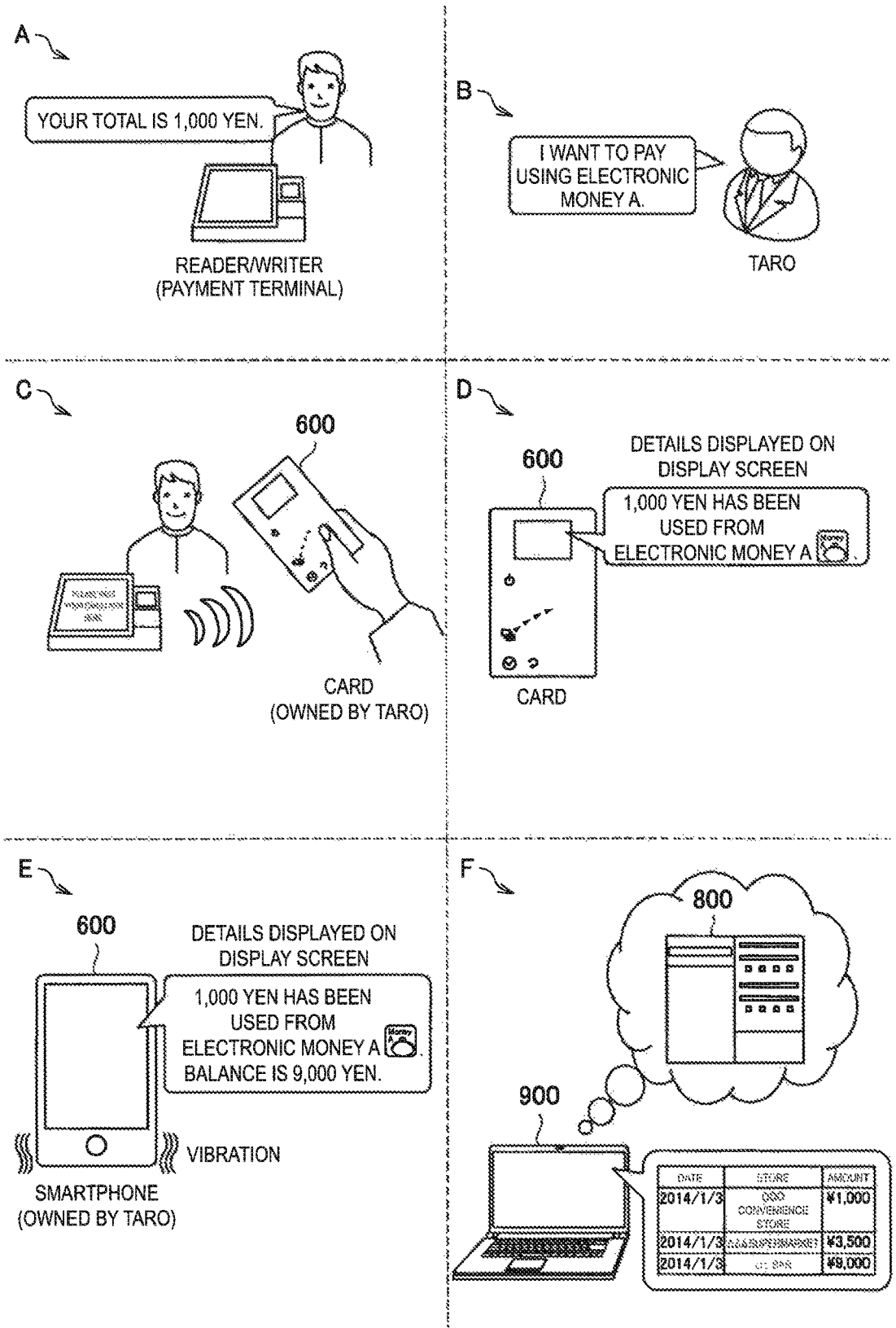
FIG. 15 is an illustrative diagram for describing a notification method according to the present embodiment.

FIG. 15 is an illustrative diagram for describing the notification method according to the present embodiment, showing an example of a use case realized in the first notification pattern. FIG. 15 chronologically shows the use case realized in the first communication pattern in the order of A of FIG. 15 to F of FIG. 15.

When payment is performed using the information processing device 600 in a real store (A of FIG. 15 to C of FIG. 15) and thus a payment process is completed between the reader/writer 500 and the information processing device 600, for example, details of the payment are displayed on a display screen of the information processing device 600 (D of FIG. 15).

When the information processing device 600 notifies the information processing device 700 of the details of the payment, the details of the payment are displayed on the display screen of the information processing device 700 (E of FIG. 15).

In addition, as the information processing device 700 notifies the server 800 of the details of the payment, for example, a user of the information processing device 600 and the information processing device 700 can ascertain the details of the payment using another information processing device 900, or the like (F of FIG. 15).

Figure 16A:
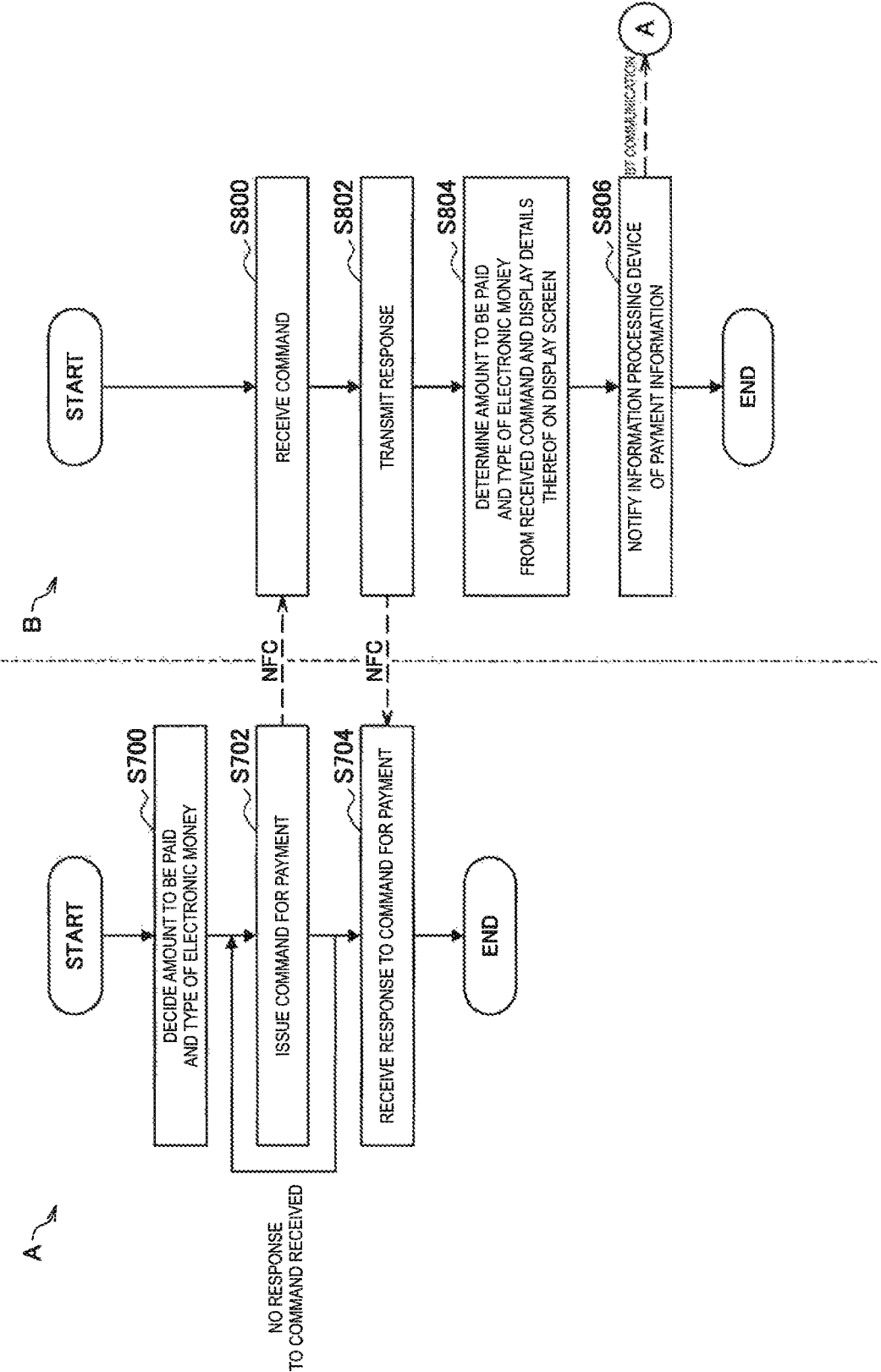
FIG. 16A is an illustrative diagram for describing a notification method according to the present embodiment.

FIG. 16A and FIG. 16B are illustrative diagrams for describing the notification method according to the present embodiment, showing examples of processes relating to a first notification pattern. A of FIG. 16A shows an example of a process of the reader/writer 500, and B of FIG. 16A shows an example of a process of the information processing device 600. In addition, A of FIG. 16B shows an example of a process of the information processing device 700, and B of FIG. 16B shows an example of a process of a server 800.

(1-1) Example of Process of Reader/Writer 500 (A of FIG. 16A)

The reader/writer 500 decides an amount to be paid and a type of electronic money to be used in payment (S700), generates a command for payment, and transmits it to the information processing device 600 (S702). When, for example, there is no response from the information processing device 600 even after a predetermined period of time set after the command for payment is transmitted elapses, the reader/writer 500 may repeat the process of Step S702. In addition, when there is no response from the information processing device 600 even after the process of Step S702 is repeated a set predetermined number of times, the reader/writer 500 can also end the process shown in A of FIG. 16A.

Upon acquiring a response to the command for payment transmitted in Step S702 from the information processing device 600, for example, the reader/writer 500 ends the process shown in A of FIG. 16A. Note that the processes of Steps S702 and A704 are performed a plurality of times according to the details of the payment process and the payment process is completed, for example, the reader/writer 500 may end the process shown in A of FIG. 16A.

(1-2) Example of Process of Information Processing Device 600 (B of FIG. 16A)

Upon receiving the command for payment transmitted from the reader/writer 500 in Step S702 shown in A of FIG. 16A (S800), the information processing device 600 gives a response to the command for payment (S802).

The information processing device 600 specifies an amount to be paid and a type of electronic money from the received command for payment, and displays details thereof on the display screen (S804). Through the process of Step S804, for example, display of the display screen shown in D of FIG. 15 is realized.

The information processing device 600 notifies the information processing device 700 of the details of the payment by transmitting payment information to the information processing device 700 (S806). Then, the information processing device 600 ends the process shown in B of FIG. 16A.

(1-3) Example of Process of Information Processing Device 700 (A of FIG. 16B)

Upon receiving the payment information transmitted from the information processing device 600 in Step S806 shown in B of FIG. 16A, the information processing device 700 determines necessity of the notification and notification details based on details indicated by the payment information (the notification details) and currently set notification settings (S900).

When no notification is determined to be performed as a result of the determination of Step S900, the information processing device 700 ends the process shown in, for example, A of FIG. 16B.

In addition, when notification is determined to be performed as a result of the determination of Step S900, the information processing device 700 causes the details indicated by the payment information to be displayed on the display screen (S904). Through the process of Step S904, the display on the display screen as shown in, for example, E of FIG. 15 is realized.

The information processing device 700 notifies the server 800 of the details of the payment by transmitting the payment information to the server 800 (S906). Then, the information processing device 700 ends the process shown in A of FIG. 16B.

(1-4) Example of Process of Server 800 (B of FIG. 16B)

Upon receiving the payment information transmitted from the information processing device 700 in Step S906 shown in A of FIG. 16B, the server 800 records the details indicated by the payment information in a database (S1000). Then, the server 800 ends the process shown in B of FIG. 16B. Since the details indicated by the payment information are recorded in the database, a user using another information processing device 900 or the like can check the details of the payment as shown in, for example, F of FIG. 15.

(1) Second Notification Pattern (B of FIG. 14)

When the payment process between the reader/writer 500 and the information processing device 600 is completed, the information processing device 600 transmits payment information to the information processing device 700 to notify the information processing device 700 of the details of payment. In addition, the information processing device 700, for example, transmits the payment information acquired from the information processing device 600 to the server 800 to notify the server 800 of the details of payment.

The server 800 determines whether or not notification for payment is necessary based on payment information acquired from the information processing device 700. For example, the server 800 determines that notification for payment is necessary when a total value of an amount to be paid within a set predetermined period such as one month exceeds a set predetermined value, or the like.

When notification for payment is determined to be necessary, the server 800 transmits, for example, notification information (data) including data indicating notification details and a command for notification to the information processing device 700 to notify the information processing device 700 of the notification details. In addition, the information processing device 700 notifies the information processing device 700 of the notification details by transmitting the notification information to the information processing device 600.

(3) Third Notification Pattern (C of FIG. 14)

When the information processing device 600 and the information processing device 700 are not present in a communicable range in which communication is possible, the respective information processing device 600 and information processing device 700 notify their users of the fact that there is no communication target device in the communicable range. When no signal transmitted from a communication target device is detected even after a set predetermined period of time elapses, for example, the respective information processing device 600 and information processing device 700 determine that there is no communication target device in the communicable range.

(4) Fourth Notification Pattern (D of FIG. 14)

To perform a payment process, the information processing device 600 transmits, for example, an approval request for requesting approval of execution of the payment process to the information processing device 700 to notify the information processing device 700 of details of payment. Here, the approval request according to the present embodiment includes, for example, an amount to be paid, and transmission command data indicating whether or not the payment process is to be executed.

Then, when the information processing device 700 gives a response to the approval request and the response indicates approval of the execution of the payment process, the information processing device 600 performs the payment process.

FIG. 17 is an illustrative diagram for describing the notification method according to the present embodiment, showing an example of a use case realized in the fourth notification pattern. FIG. 17 chronologically shows the use case realized in the fourth communication pattern in the order of A of FIG. 17 to D of FIG. 17.

For example, when payment is performed using the information processing device 600 in a real store and an amount to be paid exceeds a set predetermined amount, the information processing device 600 transmits an approval request to the information processing device 700 to notify the information processing device 700 of details of the payment (A of FIG. 17). When the information processing device 600 notifies the information processing device 700 of the details of the payment, an approval screen is displayed on the display screen of the information processing device 700 according to the approval request (B of FIG. 17).

When the payment is approved through a riser operation performed on the approval screen (C of FIG. 17), the information processing device 700 transmits a response indicating that the payment has been approved to the information processing device 600. As a result, the information processing device 600 performs the payment process with the reader/writer 500, and thereby the payment is completed (D of FIG. 17).

FIG. 18 is an illustrative diagram for describing the notification method according to the present embodiment, showing an example of a use case according to a modified example of the fourth notification pattern. FIG. 18 chronologically shows the use case according to the modified example of the fourth notification pattern in the order of A of FIG. 18 to D of FIG. 18. Although the use case in which authentication is performed through an operation of a user inputting a password is shown in FIG. 18, the use case according to the modified example of the fourth notification pattern is not limited to the example shown in FIG. 18. The use case according to the modified example of the fourth notification pattern may he, for example, a use case in which authentication is performed through another user operation such as an operation performed on a device that can be operated by a user, such as a slider.

When the information processing device 600 enters a communicable range of a device installed on a door (A of FIG. 18), the information processing device 600 causes a password input screen for unlocking the door to be displayed on the display screen (B of FIG. 18). When the password is input on the password input screen through a user operation (C of FIG. 18), the information processing device 600 transmits data indicating the password to the device installed on the door to notify the device installed on the door of the password. Then, the device installed on the door performs authentication using the notified password, and when the authentication is completed, the door is unlocked (D of FIG. 18).

Figure 19A:
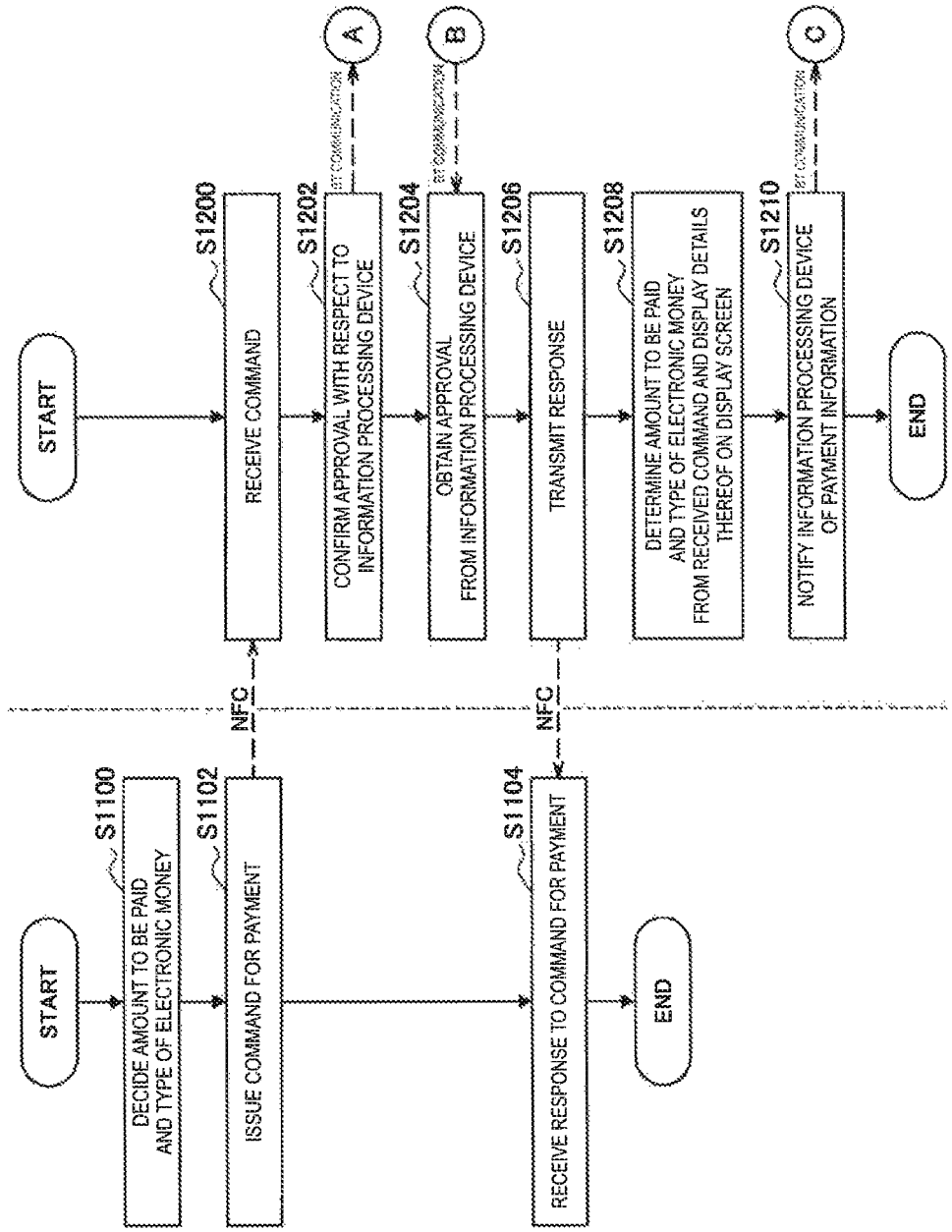
FIG. 19A is an illustrative diagram for describing a notification method according to the present embodiment.
Figure 19B:
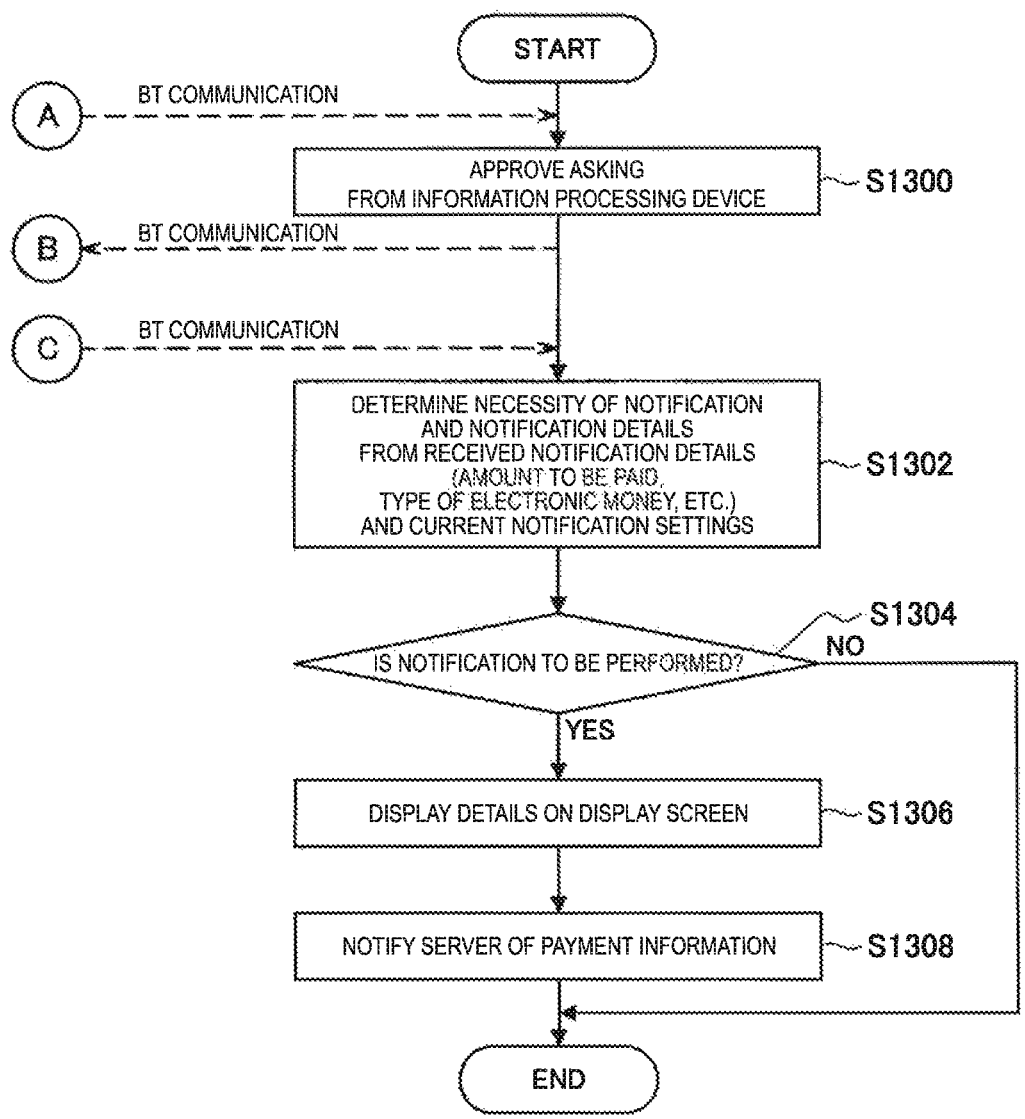
FIG. 19B is an illustrative diagram for describing a notification method according to the present embodiment.

FIG. 19A and FIG. 19B are illustrative diagrams for describing the notification method according to the present embodiment, showing examples of processes relating to a fourth notification pattern. A of FIG. 19A shows an example of a process of the reader/writer 500, and B of FIG. 19A shows an example of a process of the information processing device 600. In addition, FIG. 19B shows an example of a process of the information processing device 700.

(4-1) Example of Process of Reader/Writer 500 (A of FIG. 19A)

The reader/writer 500 decides an amount to be paid and a type of electronic money to be used in payment (S1100), generates a command for payment, and transmits it to the information processing device 600 (S1102). When, for example, there is no response from the information processing device 600 even after a predetermined period of time set after the command for payment is transmitted elapses, the reader/writer 500 may repeat the process of Step S1102. In addition, when there is no response from the information processing device 600 even after the process of Step S1102 is repeated a set predetermined number of times, the reader/writer 500 can also end the process shown in A of FIG. 19A.

Upon acquiring a response to the command for payment transmitted in Step S1102 from the information processing device 600, for example, the reader/writer 500 ends the process shown in A of FIG. 19A. Note that the processes of Steps S1102 and A1104 are performed a plurality of times according to the details of the payment process and the payment process is completed, for example, the reader/writer 500 may end the process shown in A of FIG. 19A.

(4-2) Example of Process of Information Processing Device 600 (B of FIG. 19A)

Upon receiving the command for payment transmitted from the reader/writer 500 in Step S1102 shown in A of FIG. 19A (S1200), the information processing device 600 transmits an approval request to the information processing device 700 to perform approval confirmation with respect to the information processing device 700 (S1202). The information processing device 600 obtains approval from the information processing device 700 by receiving a response to the approval request transmitted from the information processing device 700 (S1204). Then, the information processing device 600 gives a response to the command for payment transmitted from the reader/writer 500 in Step S1102 (S1206).

The information processing device 600 specifies an amount to be paid and a type of electronic money from the received command for payment, and displays details thereof on the display screen as in Step S806 of B of FIG. 16A (S1206).

The information processing device 600 notifies the information processing device 700 of the details of the payment by transmitting payment information to the information processing device 700 (S1210). Then, the information processing device 600 ends the process shown in B of FIG. 19A.

(4-3) Example of Process of Information Processing Device 700 (FIG. 19B)

Upon receiving the approval request transmitted from the information processing device 600 in Step S1202 shown in B of FIG. 19A, the information processing device 700 causes an approval screen as shown in, for example, B of FIG. 17 to be displayed on the display screen, approves asking for approval of payment from the information processing device 600 based on a user operation performed on the approval screen, and give a response to the approval request which indicates that approval has been granted (S1300). Note that the information processing device 700 can also refuse the asking for approval of payment from the information processing device 600 based on a user operation performed on the approval screen.

Upon receiving the payment information transmitted from the information processing device 700 in Step S1210 shown in B of FIG. 19A, the information processing device 700 determines necessity of the notification and notification details based on details indicated by the payment information (the notification details) and currently set notification settings (S1302).

When no notification is determined to be performed as a result of the determination of Step S1302, the information processing device 700 ends the process shown in, for example, FIG. 19B.

In addition, when notification is determined to be performed as a result of the determination of Step S1302, the information processing device 700 causes details indicated by the payment information to be displayed on the display screen as in Step S904 of B of FIG. 16A (S1306).

The information processing device 700 notifies the server 800 of the details of the payment by transmitting the payment information to the server 800 (S1308). Then, the information processing device 700 ends the process shown in FIG. 19B.

(5) Fifth Notification Pattern (E of FIG. 14)

When a process performed with the information processing device 600 fails, the reader/writer 500 transmits data indicating that the process has failed due to occurrence of an error during the process, details of the error, the cause of the error, and the like to the information processing device 600 to notify the information processing device of details of the error of the process. In addition, by causing the details of the error of the process to be displayed on, for example, a display device provided in the reader/writer 500 or an external display device connected to the reader/writer 500, the reader/writer 500 can also notify the user of the reader/writer 500 of the details of the error of the process.

In the information processing system 2000 according to the second embodiment, for example, notification in the first notification pattern shown in (1) to the fifth notification pattern shown in (5) is performed.

Since notification is performed as shown in the notification in the first notification pattern shown in (1) to the fifth notification pattern shown in (5) in the information processing system 2000, notification as indicated in, for example, (a) to (e) below is realized in the information processing system 2000, and effects as indicated below are exhibited through the notification.

(a) Notification Regarding Payment of Electronic Money

Unintended uses of electronic money can be found through the notification described in (a) above. In addition, histories with regard to payment can be stored in a device having a larger storage volume than an IC card, such as a communication device like a smartphone, or a server.

(b) Notification Regarding Charge of Electronic Money

A user can check whether or not charge of electronic money has been performed normally through the notification described in (b) above, and thus the user can be given a sense of relief.

(c) Notification Performed when Balance of Electronic Money is Lower than Certain Amount Charge of electronic money from a user can be prompted through the notification described in (c) above, and thus occasions of transaction for an electronic money service provider can increase.

(d) Notification of Upcoming Expiration Date of Season Ticket when IC Card having Function of Season Ticket is Brought to a Ticket Gate A user can be promoted to update a season ticket through the notification described in (d) above. In addition, a risk of payment using electronic money without awareness of the user in a validity period of the season ticket can be reduced through the notification described in (d) above. In addition, through the notification described in (d) above, it is possible to reduce a possibility of the user not being able to pass through a gate or being trapped in the gate because payment using electronic money is not performed when payment using the electronic money has been performed without awareness of the user in the validity period of the season ticket.

(e) Notification of Cause of Error or the Like when Payment or the Like Fails

A user can be promoted to perform an operation for re-trial of a process through the notification described in (e) above. In addition, through the notification described in (e) above, a total processing time taken per user can be reduced.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although an example in which a program causing a computer to function as the information processing device according to the present embodiment (a computer program) is provided has been shown above, the present embodiment can further provide a recording medium in which the program is stored as well.

The above-described configurations show examples of the present embodiments, and of course fall under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing device including:

a processing unit configured to acquire device-related information including identification information with which a communication target device can be specified from the communication target device when first communication with the communication target device is started, and to perform a process via communication with the communication target device using the first communication or second communication whose communicable range is wider than the first communication, wherein the processing unit starts the second communication using the acquired device-related information when the first communication is interrupted during execution of the process via communication based on the first communication and thus the process via communication that has (1)...
been executed is uncompleted in the case in which the process via communication is performed using the first communication, and
performs the uncompleted process via communication with the communication target device using the second communication.

(2)
The information processing device according to (1), wherein the processing unit
determines whether there is an uncompleted process corresponding to the communication target device based on the acquired device-related information and state information indicating a state of the process via communication, and
performs the process via communication using the first communication when it is determined that there is no uncompleted process.

(3)
The information processing device according to (1) or (2), wherein the processing unit
determines whether there is an uncompleted process corresponding to the communication target device based on the acquired device-related information and state information indicating a state of the process via communication,
starts the second communication with the communication target device using the acquired device-related information when it is determined that there is an uncompleted process, and
performs the uncompleted process via communication with the communication target device using the second communication based on the state information.

(4)
The information processing device according to (2) or (3), wherein the processing unit
causes an external device to transmit state information indicating a state of the process via communication corresponding to the communication target device when the second communication is interrupted during execution of the process via communication based on the second communication and thus the process via communication that has been executed is uncompleted, and
determines whether there is an uncompleted process corresponding to the communication target device based on the state information corresponding, to the device-related information acquired from the external device when the device-related information is acquired from the communication target device.

(5)
The information processing device according to any one of (1) to (4), wherein the processing unit
causes a generation request for generation of key information to be transmitted to the communication target device when the first communication with the communication target device is started, and
acquires the key information generated by the communication target device based on the generation request using the first communication.

(6)
The information processing device according to (5), wherein the key information is used in authentication in the second communication.

(7)
The information processing device according to (5), wherein the key information is used in execution of a process relating to a service.

(8)
The information processing device according to any one of (1) to (7), wherein the processing unit performs a payment process as the process via communication.

(9)
An information processing method including:
steps of acquiring device-related information including identification information with which a communication target device can be specified from the communication target device when first communication with the communication target device is started, and performing a process via communication with the communication target device using the first communication or second communication whose communicable range is wider than the first communication,
wherein, in the step of performing the process,
the second communication is started using the acquired device-related information when the first communication is interrupted during execution of the process via communication based on the first communication and thus the process via communication that has been executed is uncompleted in the case in which the process via communication is performed using the first communication, and
the uncompleted process via communication with the communication target device is performed using the second communication.

(10)
A program causing a computer to execute steps of acquiring device-related information including identification information with which a communication target device can be specified from the communication target device when first communication with the communication target device is started, and performing a process via communication with the communication target device using the first communication or second communication whose communicable range is wider than the first communication,
wherein, in the step of performing the process,
the second communication is started using the acquired device-related information when the first communication is interrupted during execution of the process via communication based on the first communication and thus the process via communication that has been executed is uncompleted in the case in which the process via communication is performed using the first communication, and
the uncompleted process via communication with the communication target device is performed using the second communication.

REFERENCE SIGNS LIST 100 processing device
102, 202 first communication unit
104, 204 second communication unit
106, 206 control unit
110, 210 processing unit
200 information processing terminal
300, 800 server
400 network
500 reader/writer
600, 700, 900 information processing device
1000, 2000 information processing system

The invention claimed is:

1. An information processing device comprising:
   at least one processor configured to
   start first communication with a communication target device,
   acquire device-related information including identification information with which the communication target device is specified from the communication target device when the first communication with the communication target device is started,
   perform a process via communication with the communication target device using the first communication, or using second communication whose communicable range is wider than the first communication when the first communication is interrupted,
   determine whether there is an uncompleted process corresponding to the communication target device based on the acquired device-related information and state information indicating a state of the process via communication when the first communication is interrupted,
   start the second communication with the communication target device using the acquired device-related information when the first communication is interrupted during execution of the process via communication based on the first communication and it is determined that there is an uncompleted process, and
   perform the uncompleted process via communication with the communication target device using the second communication based on the state information.

2. The information processing device according to claim 1, wherein the at least one processor
   finishes performing the process via communication using the first communication when it is determined that there is no uncompleted process.

3. The information processing device according to claim 1,
   wherein the at least one processor
   causes an external device to transmit the state information indicating the state of the process via communication corresponding to the communication target device when the first communication is interrupted during execution of the process via communication, and
   determines whether there is the uncompleted process corresponding to the communication target device based on the state information corresponding to the device-related information acquired from the external device when the device-related information is acquired from the communication target device.

4. The information processing device according to claim 1, wherein the at least one processor
   causes a generation request for generation of key information to be transmitted to the communication target device when the first communication with the communication target device is started, and
   acquires the key information generated by the communication target device based on the generation request using the first communication.

5. The information processing device according to claim 4, wherein the key information is used in authentication in the second communication.

6. The information processing device according to claim 4, wherein the key information is used in execution of a process relating to a service.

7. The information processing device according to claim 1, wherein the at least one processor performs a payment process as the process via communication.

8. An information processing method comprising:
   starting first communication with a communication target device;
   acquiring device-related information including identification information with which the communication target device is specified from the communication target device when the first communication with the communication target device is started;
   performing a process via communication with the communication target device using the first communication, or using second communication whose communicable range is wider than the first communication when the first communication is interrupted;
   determining whether there is an uncompleted process corresponding to the communication target device based on the acquired device-related information and state information indicating a state of the process via communication when the first communication is interrupted;
   starting the second communication with the communication target device using the acquired device-related information when the first communication is interrupted during execution of the process via communication based on the first communication and it is determined that there is an uncompleted process; and
   performing the uncompleted process via communication with the communication target device using the second communication based on the state information.

9. A non-transitory computer-readable medium having embodied thereon a program, which when executed by a computer causes the computer to execute a method, the method comprising:
   starting first communication with a communication target device;
   acquiring device-related information including identification information with which the communication target device is specified from the communication target device when the first communication with the communication target device is started;
   performing a process via communication with the communication target device using the first communication, or using second communication whose communicable range is wider than the first communication when the first communication is interrupted;
   determining whether there is an uncompleted process corresponding to the communication target device based on the acquired device-related information and state information indicating a state of the process via communication when the first communication is interrupted;
   starting the second communication with the communication target device using the acquired device-related information when the first communication is interrupted during execution of the process via communication based on the first communication and it is determined that there is an uncompleted process; and
   performing the uncompleted process via communication with the communication target device using the second communication based on the state information.

* * * * *